United States Patent
Guccione et al.

(10) Patent No.: US 12,244,714 B2
(45) Date of Patent: Mar. 4, 2025

(54) SYSTEM AND METHOD FOR MANAGING SECRETS IN COMPUTING ENVIRONMENTS

(71) Applicant: Keeper Security, Inc., Chicago, IL (US)

(72) Inventors: Darren S. Guccione, Chicago, IL (US); Craig B. Lurey, El Dorado Hills, CA (US)

(73) Assignee: KEEPER SECURITY, INC., Chicago, IL (US)

( * ) Notice: Subject to any disclaimer, the term of this patent is extended or adjusted under 35 U.S.C. 154(b) by 349 days.

(21) Appl. No.: 17/562,672

(22) Filed: Dec. 27, 2021

(65) Prior Publication Data
US 2023/0041959 A1  Feb. 9, 2023

Related U.S. Application Data

(60) Provisional application No. 63/228,352, filed on Aug. 2, 2021.

(51) Int. Cl.
*H04L 9/32* (2006.01)
*H04L 9/06* (2006.01)
*H04L 9/08* (2006.01)

(52) U.S. Cl.
CPC .......... *H04L 9/3213* (2013.01); *H04L 9/0643* (2013.01); *H04L 9/085* (2013.01); *H04L 9/0866* (2013.01)

(58) Field of Classification Search
CPC ..... H04L 9/085; H04L 9/3212; H04L 9/0643; H04L 9/0861; H04L 9/0866; H04L 9/0822; H04L 9/14; H04L 9/0825
See application file for complete search history.

(56) References Cited

U.S. PATENT DOCUMENTS

| | | | |
|---|---|---|---|
| 2005/0010780 A1* | 1/2005 | Kane | G06F 21/6245 713/193 |
| 2007/0266421 A1* | 11/2007 | Vaidya | H04L 63/20 726/1 |
| 2010/0077468 A1* | 3/2010 | Pragides | H04L 9/3234 726/7 |
| 2014/0215218 A1* | 7/2014 | Brands | H04L 9/3234 713/172 |
| 2015/0350179 A1* | 12/2015 | Kobayashi | H04L 9/0861 726/4 |
| 2017/0005797 A1* | 1/2017 | Lanc | H04L 9/085 |
| 2018/0159842 A1* | 6/2018 | Lurey | H04L 63/0815 |

(Continued)

*Primary Examiner* — Nam T Tran
(74) *Attorney, Agent, or Firm* — Klintworth & Rozenblat IP LLP

(57) ABSTRACT

Systems and methods for sharing secrets including passwords, keys, and other confidential information used in computing environments. A secrets record generated at a secrets vault client device is encrypted using an application key associated with a computing environment. The encrypted secrets record is stored in the secrets vault server. The secrets vault client device configures a sharing client device and associated with an access token. The secrets vault client device hashes the access token and sends to the secrets vault server as a client identifier. The sharing client device performs a first-time authentication using a hashed access token with the secrets vault server. Upon successful authentication, the sharing client device requests secrets records from the secrets vault server using the client identifier.

25 Claims, 28 Drawing Sheets

(56) References Cited

U.S. PATENT DOCUMENTS

| | | | | |
|---|---|---|---|---|
| 2018/0278585 A1* | 9/2018 | Lurey | .................... | H04L 9/3218 |
| 2020/0053059 A1* | 2/2020 | Huang | .................... | H04L 9/321 |
| 2020/0151319 A1* | 5/2020 | Sharma | ................. | H04L 63/102 |
| 2021/0165898 A1* | 6/2021 | Weiss | ....................... | H04L 9/085 |
| 2021/0406395 A1* | 12/2021 | Craggs | .................... | H04L 63/08 |
| 2022/0078007 A1* | 3/2022 | Reddem | ................. | H04L 9/085 |

\* cited by examiner

Create Secret and Shared Folder -- CLI

```
My Vault> add --login admin --pass "46$$62512%Rd1" --url "192.168.1.1" -t "My Test Secret"
My Vault> mkdir -sf -a "DevOps Secrets"
My Vault> mv "My Test Secret" "DevOps Secrets"
```

Initialize Sharing Clients Device & Get Secrets – Python SDK

600

```
pip3 install -U keeper-secrets-manager-core
```
↑ 602

```
from keeper_secrets_manager_core import SecretsManager
from keeper_secrets_manager_core.storage import FileKeyValueStorage
```
} 604

```
secrets_manager = SecretsManager(
    hostname='keepersecurity.com',
    token='<One Time Access Token>',
    config=FileKeyValueStorage('ksm-config.json')
)
```
↙ 606

```
secret = secrets_manager.get_secrets(['XXX'])[0]
```
↙ 608

```
# Show all fields and custom fields
print(mysql_secret.dict)
```
↙ 610

```
# Get a standard template field
password = secret.field('password', single=True)
```
↙ 612

```
# Get a custom field, e.g. API Key
api_key = secret.custom_field('API Key', single=True)
```
↙ 614

FIG. 6

Initialize Sharing Clients Device & Get Secrets – JAVA SDK

```
Reference the maven repository for snapshots:
repositories {
  mavenCentral()
  maven { url "https://s01.oss.sonatype.org/content/groups/public/" }
}
Add the following dependency to your project:
com.keepersecurity.secrets-manager:core:16.0.1-SNAPSHOT
```
— 702

```
import com.keepersecurity.secretsManager.core.*;
import static com.keepersecurity.secretsManager.core.SecretsManager.*;
import java.io.FileOutputStream;
```
— 704

```
// oneTimeToken is used only once to initialize the storage
// after the first run, subsequent calls will use config.json
String oneTimeToken = "<One Time Access Token>";
KeyValueStorage storage = new LocalConfigStorage("config.json");
try {
  initializeStorage(storage, oneTimeToken, "keepersecurity.com");
  SecretsManagerOptions options =
    new SecretsManagerOptions(storage);
  KeeperSecrets secrets = getSecrets(options);
  System.out.println(secrets.getRecords());
```
— 706

```
  // get the password from the first record
  KeeperRecord firstRecord = secrets.getRecords().get(0);
  String firstRecordPassword = firstRecord.getPassword();
  System.out.println(firstRecordPassword);
} catch (Exception e) {
  System.out.println(e.getMessage());
}
```
— 708

*FIG. 7*

Initialize Sharing Clients Device & Get Secrets – Docker Image

*800*

Step 1: Set Environmental Variables with Keeper notation for the secrets that are needed. For more notation examples

```
export MY_UID="SOAsfj_IlgOVenDr83gjDw"
export MY_USER="keeper://${MY_UID}/field/login"
export MY_PASS="keeper://${MY_UID}/field/password"
```

Step 2: Using the ksm exec command, the Docker build is created with the 2 secrets (login and password). The flag --inline processes the replacement of secrets. For example:

```
ksm exec --inline -- \
docker build \
--build-arg "BUILD_MY_USER=${MY_USER}" \
--build-arg "BUILD_MY_PASSWORD=${MY_PASSWORD}" \
-t my_image .
```

Step 3: In the dockerfile, we will create a linux user account using useradd and then set the password with chpasswd. The Docker file is below:

```
FROM my_base_image
ARG BUILD_MY_USER
ARG BUILD_MY_PASSWORD

RUN useradd "$(printenv --null BUILD_MY_USER)" && \
echo "$(printenv --null BUILD_MY_USER)":"$(printenv --null BUILD_MY_PASSWORD)" | chpasswd
```

*FIG. 8*

Initialize Sharing Clients Device & Get Secrets – GitHub Actions

```
on:
  push:
    branches: [ master ]

jobs:
  buildexecutable:
    runs-on: ubuntu-latest
    name: Build with Keeper secrets
    steps:
      - name: Retrieve secrets from Keeper
        id: ksecrets
        uses: Keeper-Security/ksm-action@master
        with:
          keeper-secret-config: ${{ secrets.KSM_CONFIG }}
          secrets: |
            uid123/field/password > PASSWORD
            uid234/field/password > env:PASSWORD
            uid234/field/login > LOGIN
            uid234/custom_field/Cust1 > env:CUST1
            uid321/file/Certificate.crt > file:/tmp/Certificate.crt

# View secret stored into 'PASSWORD' environment variable
      - name: Print password
        run: |
          echo "Password is ${{ env.PASSWORD }}"
          echo "Login is ${{ steps.ksecrets.outputs.LOGIN }}"
```

*900*

FIG. 9

SYSTEM AND METHOD FOR MANAGING SECRETS IN COMPUTING ENVIRONMENTS

CLAIM OF PRIORITY AND RELATED APPLICATIONS

Claim of priority is made to U.S. Provisional Patent Application Ser. No. 63/228,352, filed on Aug. 2, 2020, and incorporated by reference herein in its entirety.

BACKGROUND

Backend software running in Cloud and on-premises environments typically require the use of many types of secret information in order to function. Examples of "secrets" can include infrastructure passwords, cloud provider Access Keys, API keys, SSL certificates, SSEI certificates, database passwords, passwords to 3rd party services such as payment processors (e.g. Stripe, Paypal, etc), SMTP email server credentials, encryption keys, etc.

When software is developed, typically there is a development environment, a quality assurance environment, a staging environment, and a production environment. In each environment, the secrets required by the application may be different. For example, the development environment may use credentials for a specific environment (such as for example Stripe sandbox credentials) instead of production credentials. Employees who develop the software and the tools required to build and package the software may require access to certain sets of secrets, depending on the employee's job function and build environment. Typically, the build tools, which include, for example, continuous integration/ continuous delivery ("CI/CD") tools, may require the secrets needed to package and deploy the software in a production environment. The employees who develop software typically require access to at least the sandbox or development environment secrets in order to perform their job function and test their software.

Companies have been increasingly migrating to multi-cloud infrastructure and microservice models and have been increasing their threat surface area for supply chain attacks and password-based attacks. There is a growing need for centralizing, protecting, rotating and managing the secrets used by developers, on-prem servers, and cloud infrastructure microservices.

Entities involved in software development or other software environments currently distribute or share secrets by hard-coding them directly into software, in plaintext configuration files, in S3 buckets, or in CI/CD tools. Secrets may also be checked into source code repositories, left in notes on developer's workstations, or shared among team members through insecure channels such as instant messaging, sending emails and storing in shared file storage. Entities working in hybrid cloud or multi-cloud environments end up duplicating secrets into separate data stores in each environment and making the attack surface larger and larger. Password Managers, such as the Keeper Password Manager™, may serve as encrypted databases of secrets. However, the use of password managers by humans involves using a front-end application and typically copy-pasting or autofilling credentials into web browsers or native applications.

Currently available secrets management tools, such as the Hashicorp Vault, require hosting a local bastion host in the customer's environment to perform encryption of secrets, which are then stored into designated storage facilities. In this model, the configuration of the environment is highly cumbersome and requires the customer to install vaults within their network and to establish secure network communications between the machines and the service in order to store and retrieve secrets. The customer is also fully responsible for the backup and recovery of secrets and the separation of vault secrets between machines and environments.

SUMMARY

In view of the above, a computer-implemented method is provided for managing secrets in an enterprise computing network. The method may include generating, at a secrets vault client device, at least one secret record. An application record is generated at the secrets vault client device and associated with a computing environment in which the secrets are to be used. The application record includes an application key. At the secrets vault client device, the secrets record is associated with the application key by encrypting the secrets record using the application key to generate an encrypted secrets record.

At the secrets vault client device, at least one sharing client device is configured by generating an access token corresponding to each of at least one sharing client device and sending the access token to the sharing client device via a secondary communications channel. The access token is used to associate the sharing client device to the application using the application key. A secrets manager interface is initialized using the access token at the sharing client device. At the sharing client device, a first-time authentication is performed with the secrets vault server using the association between the access token and the application key.

At the sharing client device, the encrypted secret record and an encrypted application key are received from the secret vault server in response to the first-time authentication. The encrypted application key is decrypted using the access token at the sharing client device to generate the application key. The encrypted secret key is decrypted using the application key to generate the secrets key to decrypt the encrypted ciphertext to generate the secret record for use by the sharing client device.

In another aspect, the step of generating the at least one secret record comprises generating a secret. The secret may be encrypted using a record key. The record key may then be used as the at least one secret record to generate the at least one encrypted secrets record. The step of sending the at least one secrets record to the secrets vault server includes sending the secret as encrypted ciphertext associated with the at least one secrets record. The step of receiving, at the sharing client device in response to the first-time authentication, the at least one encrypted secrets record includes receiving the encrypted ciphertext.

In another aspect, the at least one secret record includes a shared folder key associated with a shared folder. The step of generating the at least one secret record includes generating a plurality of secret records to store in the shared folder and encrypting the plurality of secret records using the shared folder key. The step of encrypting the at least one secret record includes encrypting the shared folder key using the application key. The step of decrypting the at least one encrypted secrets record includes using the application key to generate the shared folder key and using the shared folder key to decrypt the plurality of secret records in the shared folder.

In another aspect, the step of configuring the at least one sharing client device comprises generating a client identifier by hashing the access token using a hash function and sending the client identifier corresponding to the sharing client device to the secrets vault server. The encrypted application key may be generated by encrypting the application key using the access token corresponding to the sharing client device.

DESCRIPTION OF THE DRAWINGS

FIG. 3A illustrates operation of an example method for creating a secret and a shared folder in a command line interface ("CLI") environment.

FIG. 6 illustrates operation of an example method for initializing sharing client devices and accessing secrets in a Python system development environment.

FIG. 7 illustrates operation of an example method for initializing sharing client devices and accessing secrets in a Java system development environment.

FIG. 8 illustrates operation of an example method for initializing sharing client devices and accessing secrets in a Docker CI/CD system development environment.

FIG. 9 illustrates operation of an example method for initializing sharing client devices and accessing secrets in a Python system development environment.

DETAILED DESCRIPTION

Figure 1:
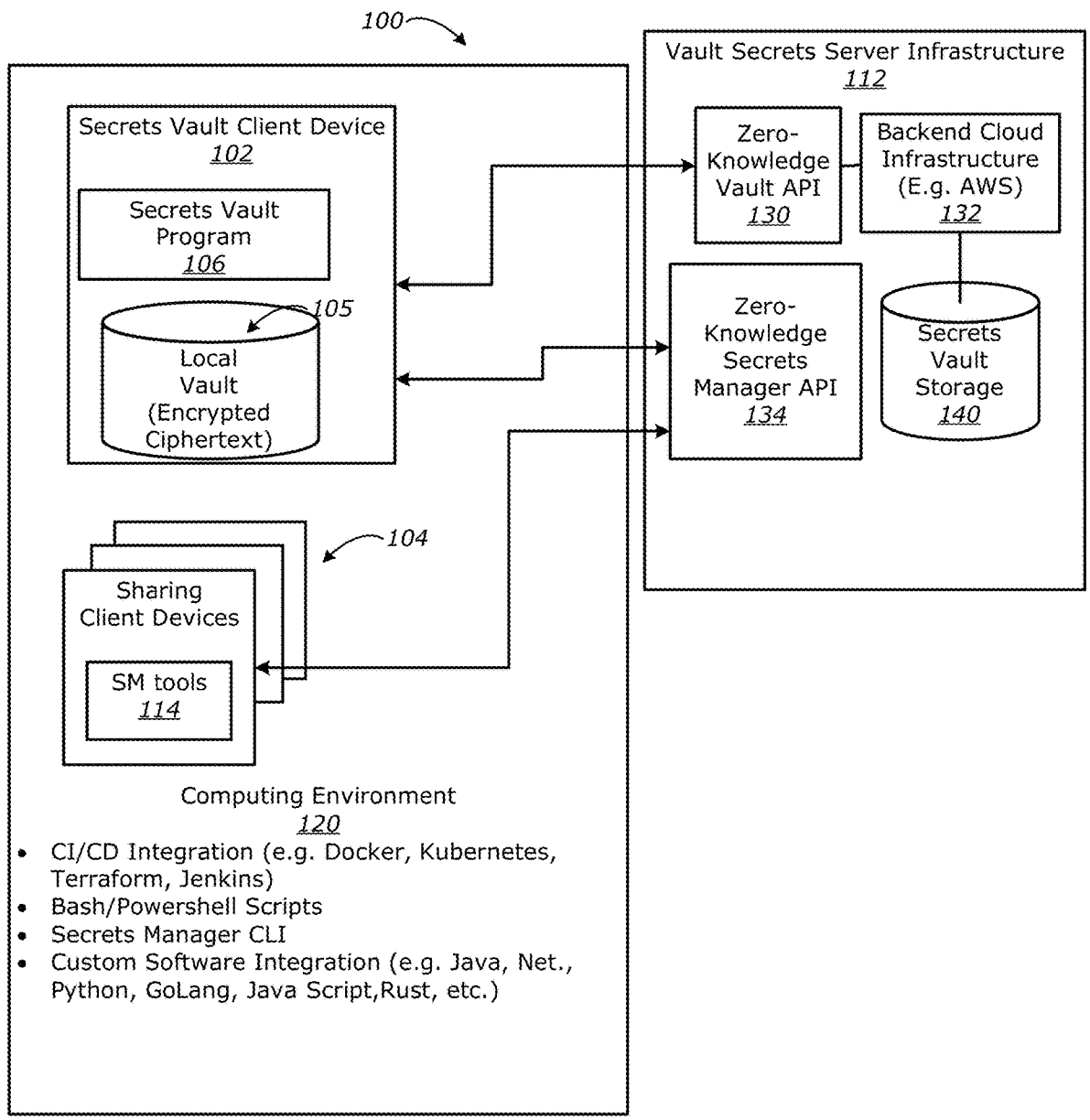
FIG. 1 is a block diagram of an example environment in which example implementations of systems for managing secrets may find advantageous use.

The following describes systems and methods for sharing secrets among members of computing environments. In example implementations, the term "secrets" shall be understood to refer to any codes, symbols, or string of digital elements that may be intended to remain confidential among members of the computing environment, such as, for example, infrastructure passwords, cloud provider Access Keys, API keys, SSL certificates, SSH certificates, database passwords, passwords to 3rd party services such as payment processors (e.g. Stripe, Paypal, etc), SMTP email server credentials, encryption keys, etc. Secrets may need to be shared in order to provide access to resources or to merely convey confidential information among the computing environment members. As described above, secrets are often shared using unsecured channels. The process of sharing secrets is also cumbersome and ad hoc. Example implementations described below provide DevOps, IT Security, and software development teams with a fully managed Cloud-hosted method of protecting and managing infrastructure secrets in a zero-knowledge environment.

In example implementations, methods are provided for machines to access and decrypt designated portions of a Cloud-hosted Zero-Knowledge vault. A zero-knowledge vault does not require an on-premises software service, and the cloud provider does not have the ability to decrypt the customer secrets. Secrets can be managed by specific "Client Devices" by designating certain secrets of a cloud vault, or entire folders. The client device is bound to the target vault secrets through the use of public/private key pairs to prevent unauthorized access to the target secrets. In an example implementation, the public/private key pairs are Elliptic Curve public/private key pairs. A client device can be a web browser, desktop computer, server, mobile device or any other computing device.

In an example implementation, secrets may be stored in a secrets vault server using a secrets vault client device equipped with a secrets manager software system. The secrets vault client device may be used to configure one or more sharing client devices, which may be initialized to access the secrets from the secrets vault server. The secrets vault client device may also be configured to initiate a client device configuration and send an URL encoded with an access token to a sharing client device. The sharing client device may use the URL to perform a client device initialization and authentication with the secrets vault server. Example implementations of cloud-hosted zero-knowledge encryption methods may be used to generate URL share links that bind a web browser to the secrets to be shared. The web browser is then used to provide access to the secrets to an outside party such as a contractor, vendor or partner.

In example implementations, a secrets management system may be implemented to provide access to secrets in a computing environment following a workflow, an example of which is described below. Typical computing environments may include multiple team members (including one or more administrators), server resources, multiple client devices used by the team members to perform software development functions, and internet access, which may include access to cloud services and other resources used in developing software systems. An administrator may be responsible for configuring computing resources for team members and providing IT services such as managing security and configuring development tools for team members. The administrator may also be responsible for managing secrets and to provide access to such secrets to team members and the client devices used by the team members. It is noted that the administrator may be any team member with administrative privileges to enable the team member to perform the administrator's functions.

FIG. 1 is a block diagram of a software development system 100 for developing software systems using a computing environment 120 configured to access a secrets vault server infrastructure 112. The computing environment 120 may include a plurality of client devices on which team members perform coding, software integration functions, software testing functions, and other system building functions. The team members share resources and secrets that may be needed to access the resources. A secrets vault client device 102 includes a secrets vault program 106 and a local vault 105 comprising a storage system configured to store local encrypted ciphertext. The secrets vault client device 102 may be used by a user to enable access to secrets to a plurality of sharing client devices 104.

The secrets vault client device 102 and/or the sharing client devices 104 may be configured and used to develop software components using software development kits ("SDK"), CLI scripts, continuous integration/continuous deployment (CI/CD) tools, etc. A user may create and share secrets using the secrets vault client application 106 on the secrets vault client device 102. Secrets and other data that is intended to be maintained securely may be stored locally in the local vault 105. The secrets may be encrypted before storing in the local vault 105.

The secrets may also be stored in a secrets vault server 112. The secrets vault server infrastructure 112 may provide a zero-knowledge vault for storing secrets and other information that users wish to keep secure. A zero-knowledge vault stores secrets but does not store any information that would allow the server to access the secrets stored on the vault. For example encrypted secrets are stored on the vault, but encryption/decryption keys that can be used to decrypt the secrets are not stored on the vault. The secrets vault server infrastructure 112 includes a zero-knowledge vault application program interface (API) 130 to perform functions for securely storing secrets such as passwords, keys, certificates, and any other information in a zero-knowledge vault. A zero-knowledge secrets manager API 134 performs functions for securely storing and sharing secrets among authenticated client devices. The secrets vault server infrastructure 112 may include a back-end cloud infrastructure 132 for access to secure storage, such as a secrets vault storage 140.

The system 100 in FIG. 1 provides an administrator or user with software tools that can be used to create secrets and to store them securely in a zero-knowledge vault. The secrets may then be shared among team members by providing sharing client devices 104 with tools for accessing the secrets from the secrets vault server. In example implementations, the sharing client devices 104 may enable a user to install a secrets manager toolkit 114 for initializing the sharing client device 104 to communicate with the secrets vault server 112 and to provide commands and software interfaces to communicate requests to the secrets vault server 112. As described in more detail below with reference to FIGS. 2A-2C, the secrets manager toolkit 114 in an example implementation may include a secrets manager command line interpreter (CLI) and APIs configured to communicate commands to the secrets vault server 112.

The administrator may perform configuration functions at an administrator console, which may be a computing device or software resources operating on a client device that is configured to manage the computing environment resources. The secrets management functions may be performed on a secrets vault client device 102 shown in FIG. 1. Secrets may be shared among team members using the following workflow:

1. The administrator enables a secrets manager service on the administrator console, or on a secrets vault client device, which shall be understood to include an administrator console or a client device configured to perform secrets management functions.
2. The team member or administrator or user logs into the secrets vault client application and creates a secret.
3. The user can optionally create a shared folder and assign team members.
4. The user performs an "Add Application" function to create a secrets manager application key on the secrets vault client device 102. An "application" "or a "secrets manager application" created by the "Add Application" function of the secrets vault client device 102 shall refer to a data construct or data structure that provides a context within which secrets are to be shared among client devices associated with the application.
5. The user generates an access token on the secrets vault client device 102 for each sharing client device 104 with which secrets are to be shared. In example implementations, a URL hyperlink that contains the One Time Access Token can be generated and communicated to each sharing client device 104 with which secrets are to be shared.
6. The user or another team member may then initialize one or more of the sharing client devices 104 using the access token. The initialization of the sharing client devices 104 includes installing and/or enabling the secrets manager toolkit 114.
7. The user or another team member may then request secrets using the sharing client devices 104 that have been assigned to the secrets manager application.

Enabling the secrets manager service may include downloading the secrets vault program 106, which may be a software application configured with secrets manager APIs and a graphical user interface (GUI) configured to implement the secrets manager functions. The secrets vault 106 may also include a secrets manager CLI and associated secrets manager functions. The application may also be a password manager application or another application configured with a secrets management feature permitting the sharing of secrets as described below. The application may be a command line interpreter ("CLI") application having command line functions that perform secrets management functions. For purposes of clarifying the description below, the application or CLI for configuring the management and sharing of secrets in a computing environment shall be referred to as a secrets vault program 106.

Examples of the above workflow are described in more detail with reference to the flowcharts and diagrams in FIGS. 2A-2E and to FIGS. 3A-3B, and 4A-4F, and 5-9. Unless otherwise expressly stated, any references to hardware or system components in the description below of the methods and processes illustrated in FIGS. 2A-2E and FIGS. 3A-3B, and 4-9 shall be understood to refer to hardware and system components shown in system 100 and the computing environment 120 in FIG. 1. FIGS. 3A, 3B, and 4A-4F, and 5-9 illustrate examples of user interfaces and actions the users can take to securely share secrets according to the example methods described in FIGS. 2A-2E.

Figure 2A:
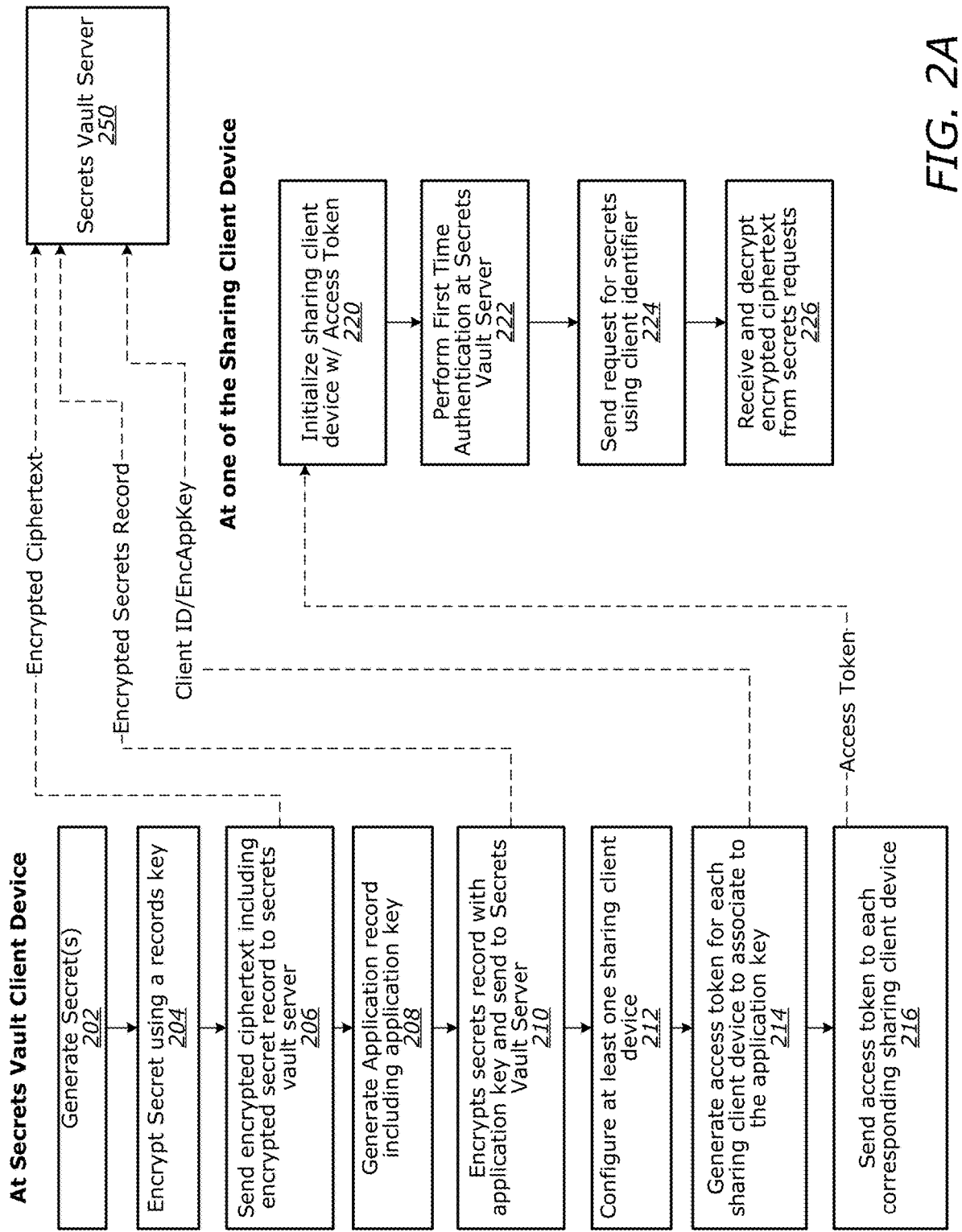
FIG. 2A is a flowchart illustrating operation of an example method for managing secrets in a software development environment.

FIG. 2A is a flowchart illustrating operation of an example method for managing secrets in an example software development environment such as for example, the system 100 in FIG. 1. An administrator, or user, may initiate a secrets creation and sharing process using the secrets vault program 106 operating on the secrets vault client device 102.

The secret may be any password, key, certificate, or other information that the user intends to maintain private and secure within the computing environment. The user may create secrets using a password management tool that generates passwords using random number generators or token generators and assigns the passwords to resources designated by the user. The user may then enable authentication with the resource using the generated password. The user may also enter already generated and authenticated passwords in the secret vault program as the secret being created. The user may create the secrets and enable the sharing of the secrets as the need arises such as when resources are configured for use in the computing environment, or in an administrative operation in configuring and deploying the computing environment for service.

As noted in the above workflow description, the user enables operation of the secrets manager services to enable the sharing of secrets in example implementations. The secrets manager services may be enabled by installing the secrets vault program 106 described above with reference to FIG. 1. Once the user enables the secrets manager services provided by the secrets vault program 106, the user may create one or more secrets at step 202 in FIG. 2A. The user may also create a shared folder to contain the secrets and share the secrets as a collection in the shared folder. Example implementations described herein illustrate sharing secrets in shared folders. However, it is to be understood that the use of shared folders is an optional feature in example implementations. Secrets may be created and shared individually and without the use of a shared folder.

The secrets vault program 106 may be configured to receive a secret as the user enters it in a text box prompt or as a parameter for a command in the CLI or may generate the secret using a random number generator or a suitable type of symbol generating function. Example implementations of the secrets manager enable sharing of secrets to designated sharing client devices in a manner that minimizes risks of cyber-attacks.

At step 204, the created secret may be encrypted using a records key to generate a secrets record. The records key may be an encryption key used by a password manager program to encrypt any data element that is to be stored in the secrets vault server 250. The records key may be stored in secure storage on the secrets vault client device 102, but may not be stored in the secrets vault server 250. The use of a records key may add a layer of protection for the secrets record.

In example implementations, the secret may be generated for storage in a shared folder, which may be configured to contain secrets having a shared context. For example, a shared folder may contain secrets for accessing resources used in a particular software development project by a particular team of engineers. A shared folder may also contain secrets used for a specific phase of development in the development of a software product or system. A shared folder may also contain secrets for use by a specific group of team members.

The user may invoke functions of the secrets vault program on the secrets vault client device 102 to create the shared folder, which may also generate a shared folder key. The shared folder may contain individual secret records, which may then be encrypted using the shared folder key. In another embodiment, the shared folder key may include individual secret records, which may each be encrypted by a records key. The records key may be encrypted using the shared folder key when the secrets record and its corresponding records key are contained in the shared folder.

In sharing a shared folder in an environment in which secrets are encrypted using a record key, the secrets are encrypted using the record key, and the record key for each secret stored in the shared folder may be encrypted using the shared folder key. The record key for sharing individual secrets and the shared folder key for sharing secrets in the shared folder shall be referred to hereafter as the secrets record. The shared folder key decrypts each secret in the shared folder that is encrypted by the record key. Each secret is then decrypted using the record key. The shared folder key may be used to encrypt the secrets it contains when the secret is added to the shared folder.

The secrets vault program 106 may include a function for designating team members to share the secrets and/or the shared folder that contains the secrets. The team members can be designated to have different levels of access.

At step 206 in FIG. 2A, the secrets and/or shared folder may be stored in the secrets vault server 250. Only the encrypted secrets and shared folder may be stored in the secrets vault server 250. The shared folder key and the records key are not stored in the secrets vault server 250 so as to maintain zero knowledge. The shared folder and encrypted secrets are stored in the secrets vault server 250 as encrypted ciphertext as shown in FIG. 2A.

At step 208, the user may create a secrets manager application ("Application"). The Application defines a context in which to store the secrets and a context in which to share the secrets. In an example implementation, the Application includes a 256-bit Advanced Encryption Standard ("AES") "Application Key," which is generated on the secrets vault client device 102. The secrets vault client device 102 does not display the Application in the user interface. The Application is stored in the secrets vault server like any other record. The Application record may be defined to contain the following fields: Title, Type of "Application" and Application Key. It is noted that the Application key may be any suitable size and generated according to any suitable encryption standard.

At step 210, the secrets vault program 106 may include functions to associate the secrets record (i.e. records key and/or shared folder key) with the Application. In example implementations, the association is made by encrypting the secrets record using the application key to generate an encrypted secrets record. The encrypted secrets record is then stored in the secrets vault server 250 as shown in FIG. 2A. It is noted that in an example implementation, the application may encrypt the secret record (unencrypted version) itself. As used herein, the term "secret record" shall refer to a secret, a record key, and/or a shared folder key, which may be encrypted using the application key at step 210. Those of ordinary skill in the art would understand the encryption and decryption of secrets starting with the use of an unencrypted application key. Examples are described below.

At step 212, the user may configure individual client devices ("shared client devices 104") as client devices with access to the secrets encrypted with the application key. The sharing client devices 104 may be computing devices, such as computers, laptops, or other suitable computing devices. The sharing client devices 104 may also include web browsers or other similar software components that may be used in the computing environment. The secrets manager system may include commands for defining a shared client device as having access to the Application. In an example implementation, an "Add" command may be included to generate a client device record that associates the Application with a client device.

At step 214, an access token may be generated for each client device with which the Application is to be shared. In an example implementation, the access token is a 256-bit AES key although a key of any suitable size or any suitable encryption standard may be used. The access token may be designated as a one-time access token in that it is used for a one-time authentication. At step 216, each access token is communicated to each corresponding sharing client device 104.

Figure 2B:
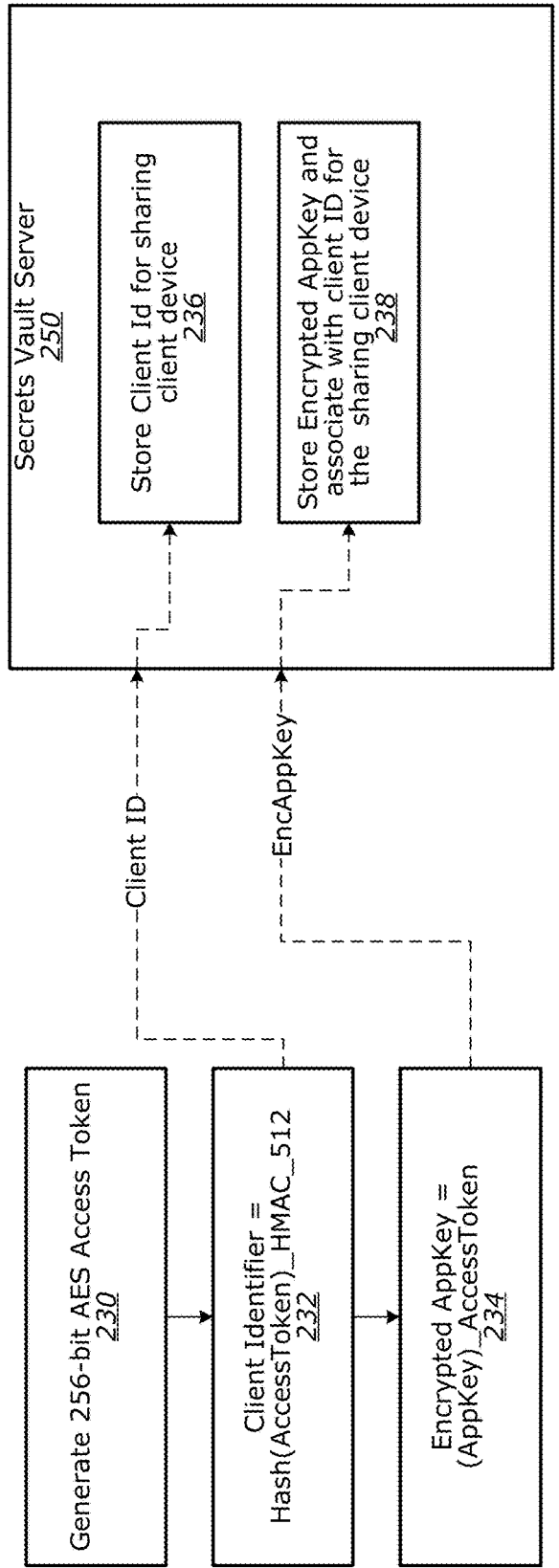
FIG. 2B is a flowchart illustrating operation of an example method for configuring a sharing client device to enable the sharing client device to access secrets stored in the secrets vault server.

FIG. 2B is a flowchart illustrating an example implementation of the process of steps 214 and 216, and steps performed by the secrets vault server 250 in response. At step 230 in FIG. 2B, the secrets vault client device 102 generates the 256-bit AES access token. At step 232, each access token is hashed using a hashing algorithm to generate a client identifier identifying the sharing client device corresponding to the access token. The client identifier is communicated to the secrets vault server 250 where it is stored at step 236 and used by the secrets vault server 112 to identify the sharing client device when requesting access to secrets.

The secrets vault client device may generate the client identifier by hashing the access token using the HMAC_512 hashing algorithm in example implementations. Other suitable hashing algorithms may be used as well. At step 234, the Application key for the Application designating the secrets to be shared with the sharing client device identified by the access token may be encrypted using the access token to generate an encrypted application key (EncAppKey). The encrypted application key for each sharing client device is sent for storage to the secrets vault server 250. The secrets vault server 250 stores the encrypted application key with the client identifier for each sharing client device at step 238 in FIG. 2B. The step of sending the access tokens to their corresponding sharing client devices may be performed through messaging (email, text, etc.), copy-paste, etc., but not via transmission to the secrets vault server 250. The access token is preferably not stored in the secrets vault server 250 unencrypted in order to maintain zero-knowledge.

Each sharing client device 104 that has received its corresponding access token may initialize a process at step 220 for requesting access to the Application secrets. At step 220, one of the sharing client devices 104 performs the initialization process for the access token provided by the secrets vault client device 102.

It is noted that the secrets vault client device 102 may have been previously configured to perform secrets storage transaction with the secrets vault server 250. Such a configuration may include, in example implementations, the creation of a secrets vault server private/public key pair by the secrets vault server 250. The secrets vault server private key may be maintained or stored in the secrets vault server 250 for encrypting communications to entities, such as the secrets vault client device 102, that are authorized to communicate with the secrets vault server 250. The secrets vault server public key may be communicated to the secrets vault client device 102 in order to decrypt communications that have been encrypted using the secrets vault server private key on the secrets vault server 250. The secrets vault client device 102 may encrypt communications to the secrets vault server 250 with the secrets vault server public key to enable the secrets vault server to decrypt such communications with the secrets vault server private key. The secrets vault client device 102 may share the secrets vault public key with sharing client devices 104 in when communicating the access token so that the sharing client device 104 can communicate with the secrets vault server for at least a first time authentication on the secrets vault server 250.

Figure 2C:
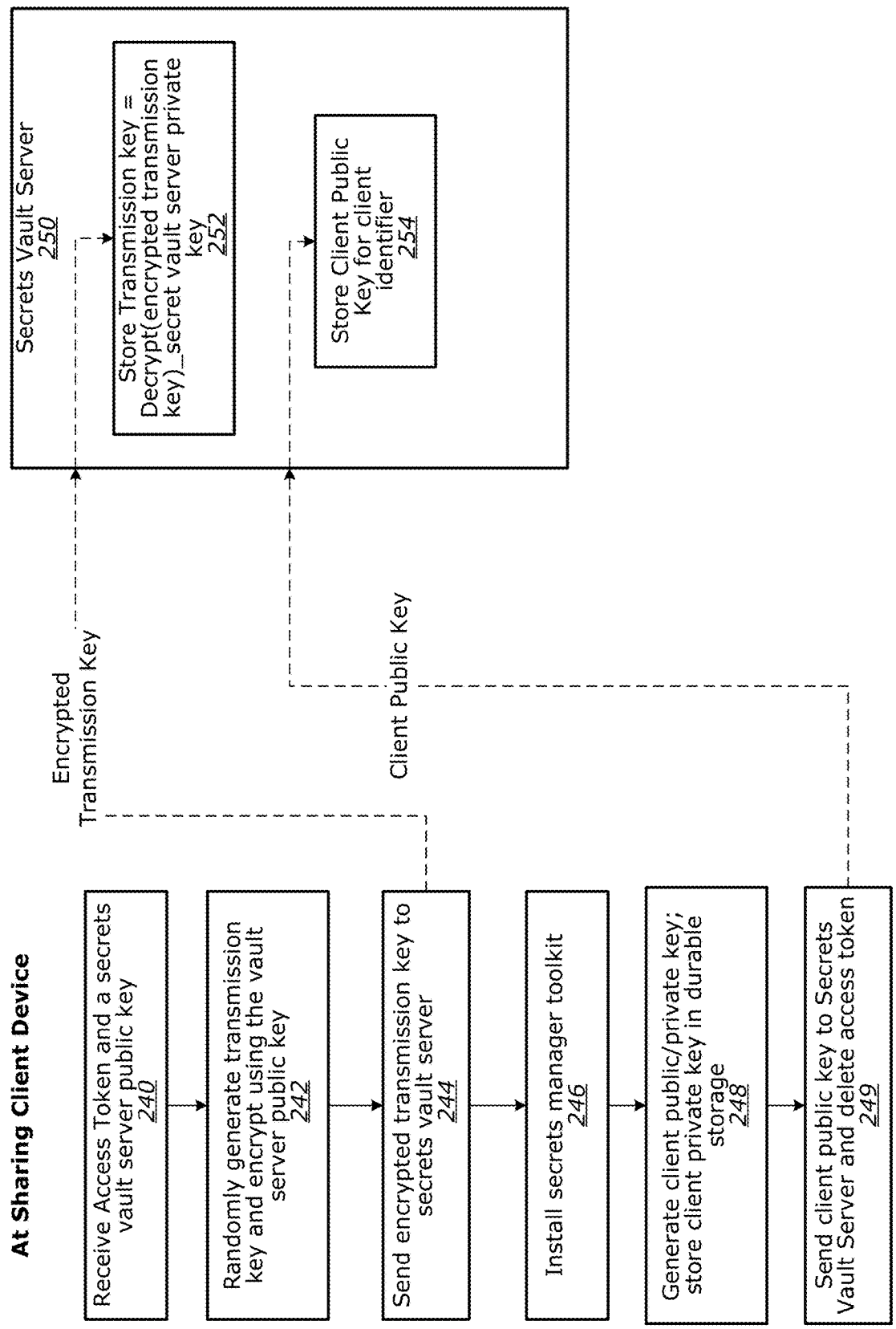
FIG. 2C is a flowchart illustrating operation of an example method for initializing a sharing client device from a secrets vault client device.

FIG. 2C is a flowchart illustrating operation of the initialization of the sharing client device 104 at step 220. At step 240 in FIG. 2C, the sharing clients device 104 receives the access token and a secrets vault server public key, which permits communication with the secrets vault server 250 for at least a first time authentication on the secrets vault server 250.

At step 242, the sharing client device 104 generates a transmission key. In an example implementation, the transmission key is generated as a AES-256 bit transmission key, which may then be encrypted using the secrets vault public key. At step 244, the encrypted transmission key is communicated to the secrets vault server 250. The encrypted transmission key is decrypted on the secrets vault server using the secrets vault server private key at step 252 and stored in association with the client identifier for the sharing client device 104 that sent the encrypted transmission key.

At step 246, the user at the sharing client device 104 installs or otherwise enables a secrets manager toolkit, which may include tools for communicating requests for secrets from the secrets vault server 250. The secrets manager toolkit a secrets manager CLI and an application programming interface (API) that allows a user to configure commands that directly communicate requests and other instructions for secrets information from the secrets vault server 250.

In an example implementation, a secrets manager CLI may be developed to provide core secrets manager functionality and allow interaction from a terminal, shell, or any software that can be launched from a shell. The secrets manager CLI may be installed using commands from a programming SDK. In one example, an example of the 'pip3' Python instruction that may be used to install the secrets manager CLI may be provided as follows:

1 $ pip3 install secrets-manager-cli

Once the secrets manager CLI is installed, the sharing client device may be initialized using commands provided by the secrets manager CLI and the access token corresponding to the sharing clients device 104 that is being initialized. The installation of the secrets manager CLI is described in more detail below with reference to FIGS. 5-9.

Once the secrets manager CLI is installed at step 246, the sharing client device 104 generates a client public/private key pair to provide a layer of security in communications with secrets vault server 250. The client public/private key pair in an example implementation may be an elliptical curve key pair. The client private key is stored locally on the sharing client device 104. The client public key is communicated at step 249 to the secrets vault server 250 for storage associated with the client identifier for the sharing client device 104 as shown at step 254 in the secrets vault server 250.

Figure 2D:
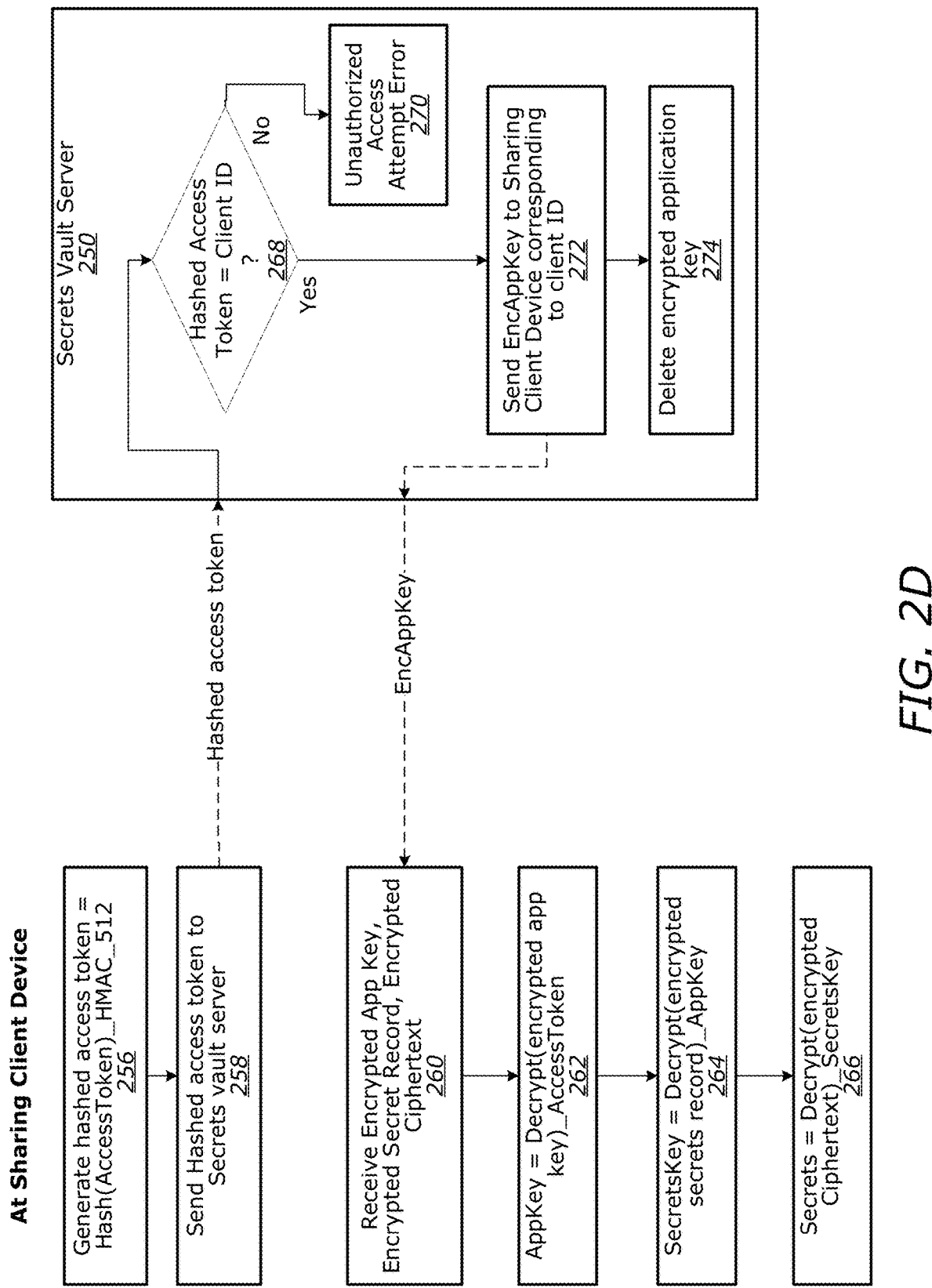
FIG. 2D is a flowchart illustrating operation of an example method for performing a first time authentication from a sharing client device.

At step 222, a first time authentication is performed by the sharing client device 104 at the secrets vault server 250. FIG. 2D is a flowchart illustrating operation of a first-time authentication of the sharing client device 104 with the secrets vault server 250. The first-time authentication of the sharing client device involves hashing the access token to generate a hashed access token. The hashing may be performed using the same hashing algorithm used to hash the access token in generating the client identifier by the secrets vault client device 102 at step 232 in FIG. 2B. The access token is hashed using the HMAC_512 hashing algorithm at the sharing client device 104 at step 256 in FIG. 2D, which is the same algorithm used to hash the access token by the secret vault client device 102 at step 232 in FIG. 2B. At step 258, the hashed access token is communicated to the secrets vault server 250.

At decision block 268 in FIG. 2D, the secrets vault server 250 compares the hashed access token with the client identifier corresponding to the sharing client device 104. If the hashed access token is not the same as the client identifier, an unauthorized attempt to access secrets is being attempted at step 270 and a specified set of error alerts, or remedial action is undertaken. If the hashed access token matches the client identifier, the encrypted application key corresponding to the sharing client device 104 is communicated back to the sharing client device at step 272. The matching of the hashed access token and the client identifier confirms that the sharing client device 104 that communicated the hashed access token is authorized to receive secrets corresponding to the Application associated with the sharing client device 104. The encrypted ciphertext corresponding to the application key may be communicated to the sharing client device 104 along with the encrypted application key. With the hashed access token having matched the client identifier, the secrets vault server 250 deletes the encrypted application key at step 274. Further exchanges of communications requests and responses to the requests are performed using the client public/private key pair and the client identifier.

At step 260, the sharing client device 104 receives the encrypted application key and if communicated, the encrypted cipher text. The sharing client device 104 may designate the hashed access token to be the client identifier after having matched with the client identifier stored in the secrets vault server 250 that was communicated to the secrets vault server 250 by the secrets vault client device 102 during configuration of the sharing client device 104. The sharing client device 104 uses the client identifier to make requests for secrets at the secrets vault server.

At step 262, the encrypted application key is decrypted using the access token, which was used to encrypt the application key at the secrets client device 102 during configuration of the sharing client device 104. At step 264, the encrypted secrets record included in the encrypted ciphertext is decrypted using the application key to generate the record key. At step 266, the records key is used to decrypt the rest of the encrypted ciphertext to generate the secrets being shared with the sharing client device 104. The secrets may then be listed or otherwise provided to the user using a secrets manager CLI command as described below with reference to FIGS. 5-9.

Referring back to FIG. 2A, after the first authentication of the sharing client device 104 at the secrets vault server 250, the sharing client device 104 may send requests for secrets using the client identifier of the sharing client device. The sharing client device 104 receives and decrypts encrypted ciphertext from having requested secrets from the secrets vault server 250 as shown in FIG. 2E.

Figure 2E:
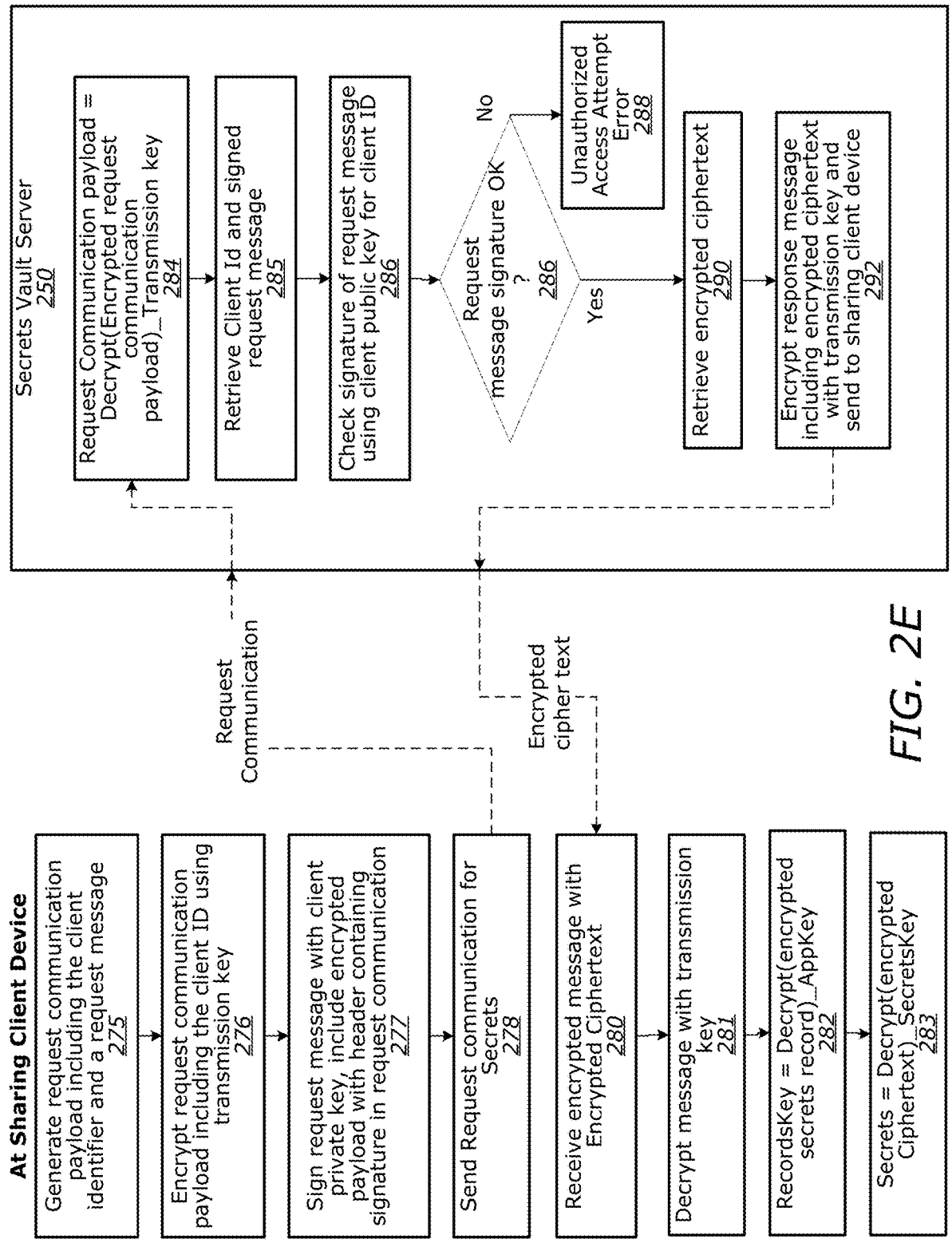
FIG. 2E is a flowchart illustrating operation of an example method for requesting and receiving secrets from a secrets vault server after a first-time authentication.

Referring to FIG. 2E, the user at the sharing client device 104 may enter a command or operate software that executes a command from the secrets manager CLI in which a request for secrets is communicated to the secrets vault server 250. In accordance with typical protocols for communicating over the Internet, a request for secrets may be configured for communication to the secrets vault server 250. At step 275, a secrets request message may include a request communication payload, which includes a client identifier. Other information may be included in the request communication payload, such as for example, a command and other information that allows for the request to be tailored to specific circumstances. At a minimum, the request communication payload includes the client identifier. At step 276, the request communication payload (which includes the client identifier) is encrypted using the transmission key generated at step 242 of FIG. 2C. The entire request message may then be signed using the client private key at step 277. The signed message to be sent to the secrets vault server 250 includes the payload encrypted using the transmission key, and the signature, which may include the payload hashed or encrypted with the client private key. At step 278, the request message for secrets is communicated to the secrets vault server 250 to request secrets associated with the Application corresponding to the sharing client device 104.

At the secrets vault server 250, at step 284, the request communication payload is decrypted using the transmission key provided by the sharing client device at step 244 of FIG. 2C. The encryption and decryption using the transmission key reduces the risk of a man-in-the-middle attack ("MITM") during communication of the messages between the sharing client device and the secrets vault server. The decryption of the request communication payload yields the client identifier of the sharing client device 104 requesting the secrets from the secrets vault server 250. The client identifier is retrieved by the secrets vault serv 285 and used to retrieve the client public key corresponding to the sharing client device 104 provided by the sharing client device 104 at step 249 of FIG. 2C. The signature of the request communication message is then checked using the client public key at step 286. At decision block 287, if the signature of the request message is not valid, an attempt at an unauthorized access is being made and an error may be signaled at step 288. If the request message signature is valid, the secrets vault server 250 retrieves the encrypted ciphertext at step 290. At step 292, a response message that includes the encrypted ciphertext is encrypted using the transmission key and communicated to the sharing client device 104.

At step 280, the sharing client device receives the encrypted response message containing the encrypted ciphertext communicated by the secrets vault server 250. At step 281, the encrypted response message is decrypted using the transmission key. The encrypted ciphertext in the decrypted response message contains the encrypted secrets record. At step 282, the encrypted secrets record is decrypted using the application key, which was received in encrypted form from the secrets vault server 250 upon successful first-time authorization by the sharing client device 104 at the secrets vault server 250 (see step 262 in FIG. 2D). Decryption of the encrypted secrets record yields the record key. At step 283, the encrypted ciphertext is decrypted using the record key. Decryption of the encrypted ciphertext may include decryption of the record keys stored in a shared folder. The secrets record would then be the shared folder key and the shared folder key is used to decrypt the encrypted record keys to yield the secrets.

It is noted that the requesting of secrets and reception of secrets including the corresponding encryption and decryption steps may be performed by software components of the secrets manager CLI when a corresponding command is executed. For example, the secrets manager CLI may include a "list" command for listing the secrets for an application. The sharing client device 104 communicates the request for secrets to the secrets vault server 104 when the list command is executed. The list command may be executed as a command by the user from the command line interpreter at a terminal for example. The list command may also be part of a script or included in an instruction of software code configured to use secrets manager resources. FIGS. 3A, 3B, and 4-9 illustrate various examples of how the user may initiate execution of commands that initialize the sharing client device and commands that request secrets from the secrets vault server.

FIG. 3A illustrates examples of commands at 300 that may be entered at a command line to initiate the creation of a secret and a shared folder using the secrets manager CLI. In the example in FIG. 3A, the secret is a password for a resource used by a DevOps group. At 302, the user may enter an add password command with a password value of "46$$62512% Rd1" for use to authenticate at URL "192.168.1.1." The password added at 302 is defined for use in authenticating the admin at login of the service identified by the URL. A label of "My Test Score" is provided for the password in the "add" command. The password value may be encrypted using a vault record key, which may be an encryption key used to encrypt records to be stored in the vault.

At 304 in FIG. 3A, the user creates a shared folder called DevOpsSecrets" using a mkdir command. At 306, the password called "My Test Scores" is moved into the shared folder "DevOps Secrets." The "DevOps Secrets" folder may store secrets used by team members to perform DevOps functions. The shared folder can also be configured for a team performing DevOps functions in a specific project, a specific location, or other factors used in identifying a team. The step 304 of creating the shared folder may generate a shared folder key, which may be used to encrypt each secret in the shared folder. The secrets may be encrypted with the shared folder key to generate a plurality of encrypted secrets. The encrypted secrets and the shared folder key are maintained in the local vault as secrets to be stored in the secrets vault server.

It is noted that the CLI used by the user to perform commands to create secrets and shared folders may be a different software tool from the secrets manager CLI described above with reference to FIGS. 2A-2E. The CLI used in FIG. 3A and in other functions involving creating secrets, creating applications, and configuring sharing client devices may be a component of a secrets configuration tool or a password manager that includes secrets management features. The secrets manager CLI may be used with system SDKs and CI/CD tools in accessing the secrets within the various computing environments in which secrets are to be shared.

Figure 3B:
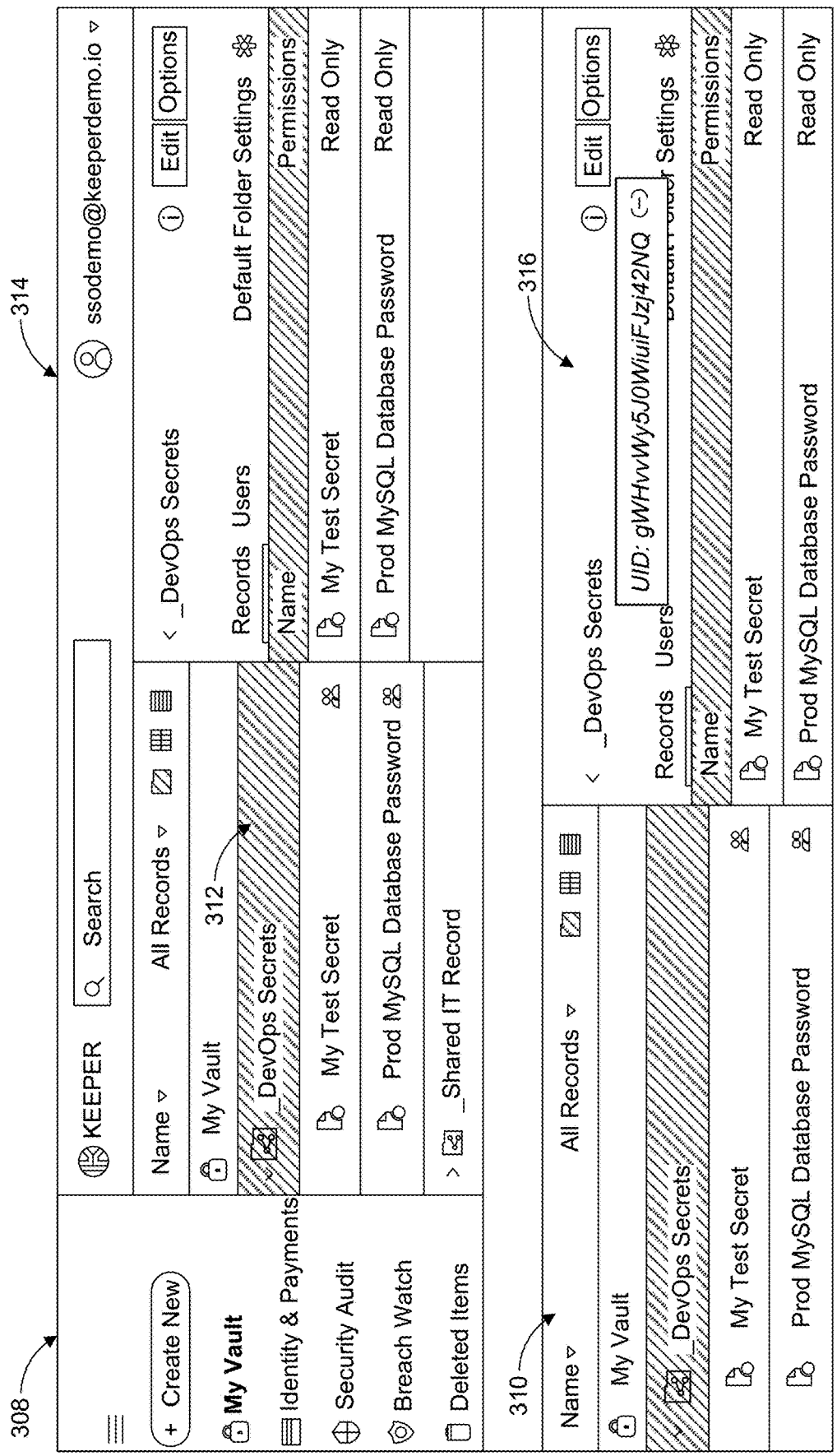
FIG. 3B illustrates operation of an example method for creating a secret and a shared folder in a graphical user interface environment.

FIG. 3B illustrates a graphical user interface (GUI) 308 configured to receive user input to create a secret and a shared folder. FIG. 3B shows a first view 309 and a second view 311 of the GUI 308 used for creating secrets and shared folders. In the first view 309, a menu 313 of functions is displayed for the secrets vault program. One or more shared folders may be shown in a folder list 312 next to the menu 313 and a folder view 314 is displayed next to the folder list 312.

The folder list 312 displays the shared folders that have been created to store the secrets being managed by the secrets vault program 106 (in FIG. 1). A GUI tool is provided to create the shared folders. A data input box may be presented to prompt the user for a folder name and a description. The secrets may be added using a GUI tool (e.g. a button or menu item). In the example shown in FIG. 3B, the user may create a secret by selecting the "Create New" button in the menu 313. The "Create New" button in the menu 313 may be configured to enable the creation of a secret as well as other date elements (e.g. folder, shared folder, etc.).

The "Create New" button in the menu 313 may be configured to prompt the user to select a record type. For example, a drop-down menu may be displayed to allow the user to select various record types, such as for example, a login record (e.g. passwords), payment card records, contact information, addresses, and bank account information. When the user selects a record type, a pop-up text box may appear with prompts for a record title and other information relevant to the record type. For example, the record type may be a database that is to be accessed for information during development or during operation of a software system. The user may be prompted for a title, a database type, a hostname or IP address, a port, a login username, and a password. The user may enter, for example, "Prod MySQL Database Password" in the title field. The password may be generated during entry of the data when defining the record or by the user entering the password from the keyboard. When the user has entered a minimum amount of data for the implementation, the record or secret may be stored. The user interface 308 displays the secret record in the list of records in the shared folder "DevOps Secrets" as shown at 312, 314, and 311.

Figure 4A:
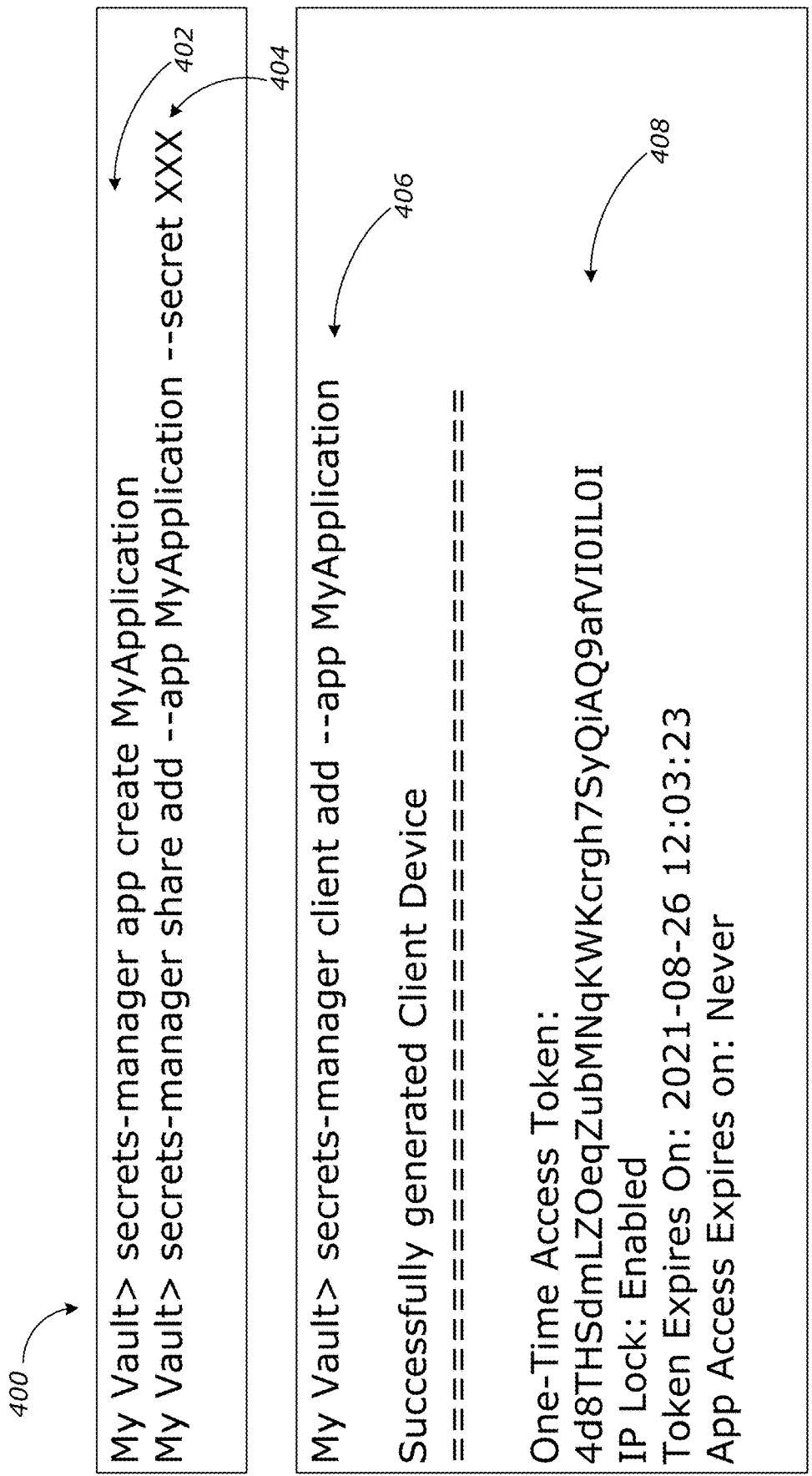
FIGS. 4A-4F illustrates operation of an example method for creating an application and a client device in a CLI environment and in a GUI environment.

FIG. 4A illustrates operation of an example method 400 for creating an application and a client device in a CLI environment. The CLI may include a secrets manager command "add" for creating a secrets manager application with a name "MyApplication" at line 402. At line 404, a secrets manager "share add" command may be used to associate the secret "XXX" with the newly created application "MyApplication." At line 406, the secrets manager "client add" command may be used to configure a sharing client associated with the application "MyApplication." Lines 408 list the One-Time Access Token generated to correspond to the configured sharing client device. Lines 408 also indicates that IP Lock is enabled, which provides a more secure environment for the communication of messages between the secrets client device 102 and the secrets vault server 250. A token expiration time and an application access expiration date may be provided at lines 408.

It is noted that the steps shown in FIG. 4A may involve the exchange of messages between the secrets vault client device 102 and the secrets vault server 250 described above at steps 212 to 216. The messages being communicated in the steps described with reference to FIGS. 2A-2E are exchanged during the execution of the commands whose operation is described with reference to FIGS. 5-9.

Figure 4B:
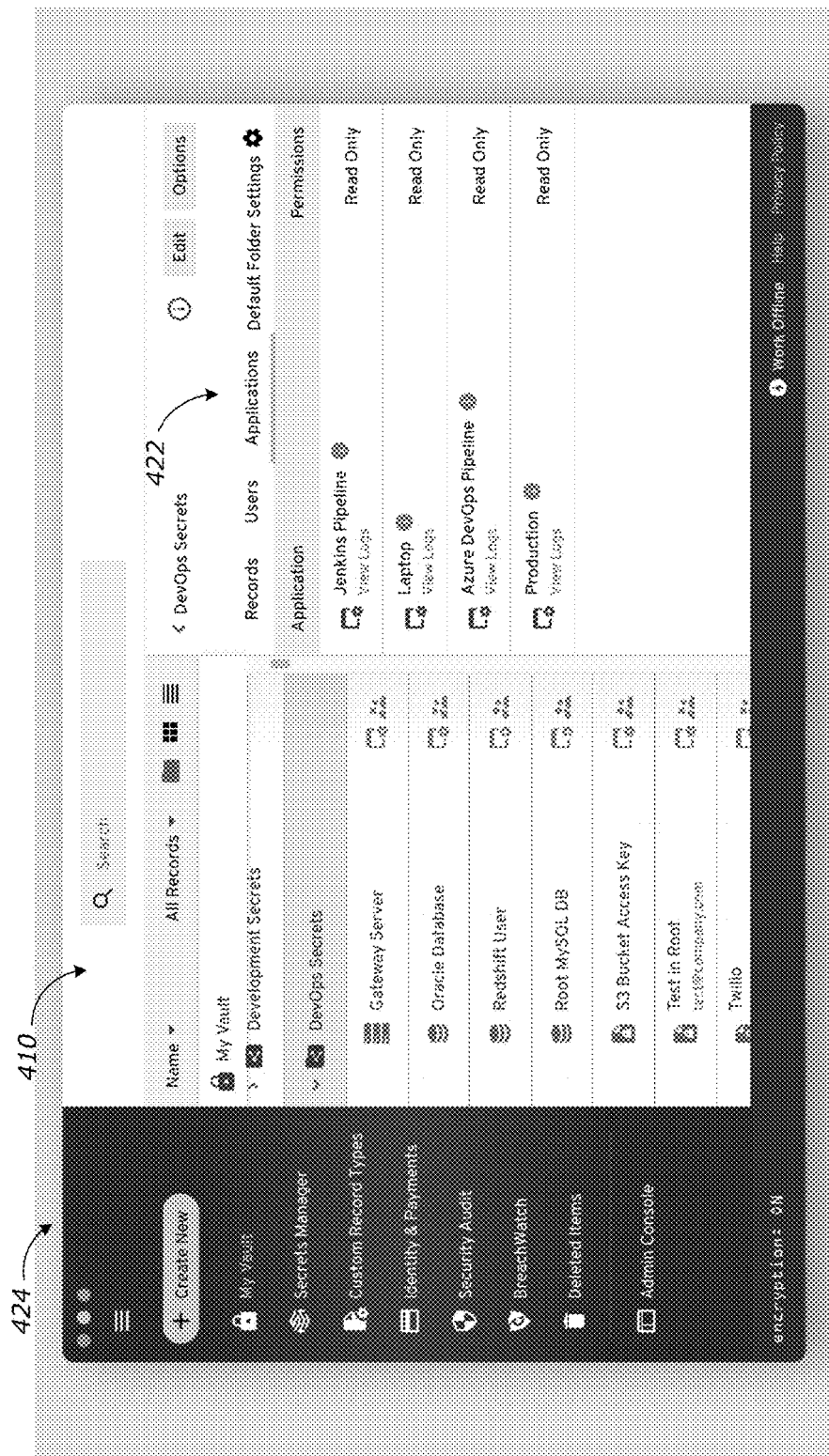

FIGS. 4B-4F illustrate examples of graphical user interface screens that may be used in creating an application using a GUI. FIG. 4B illustrates an example home screen 410 displaying a list of folders, which may be shared folders, at 420. The folders at 420 may include secrets that share a context with each other in each folder. Each folder at 420 may include one or more applications listed in FIG. 4B at 422. A menu may be used to select other types of elements to list for the selected folder such as for example, records, users, applications, and default folder settings.

Figure 4C:
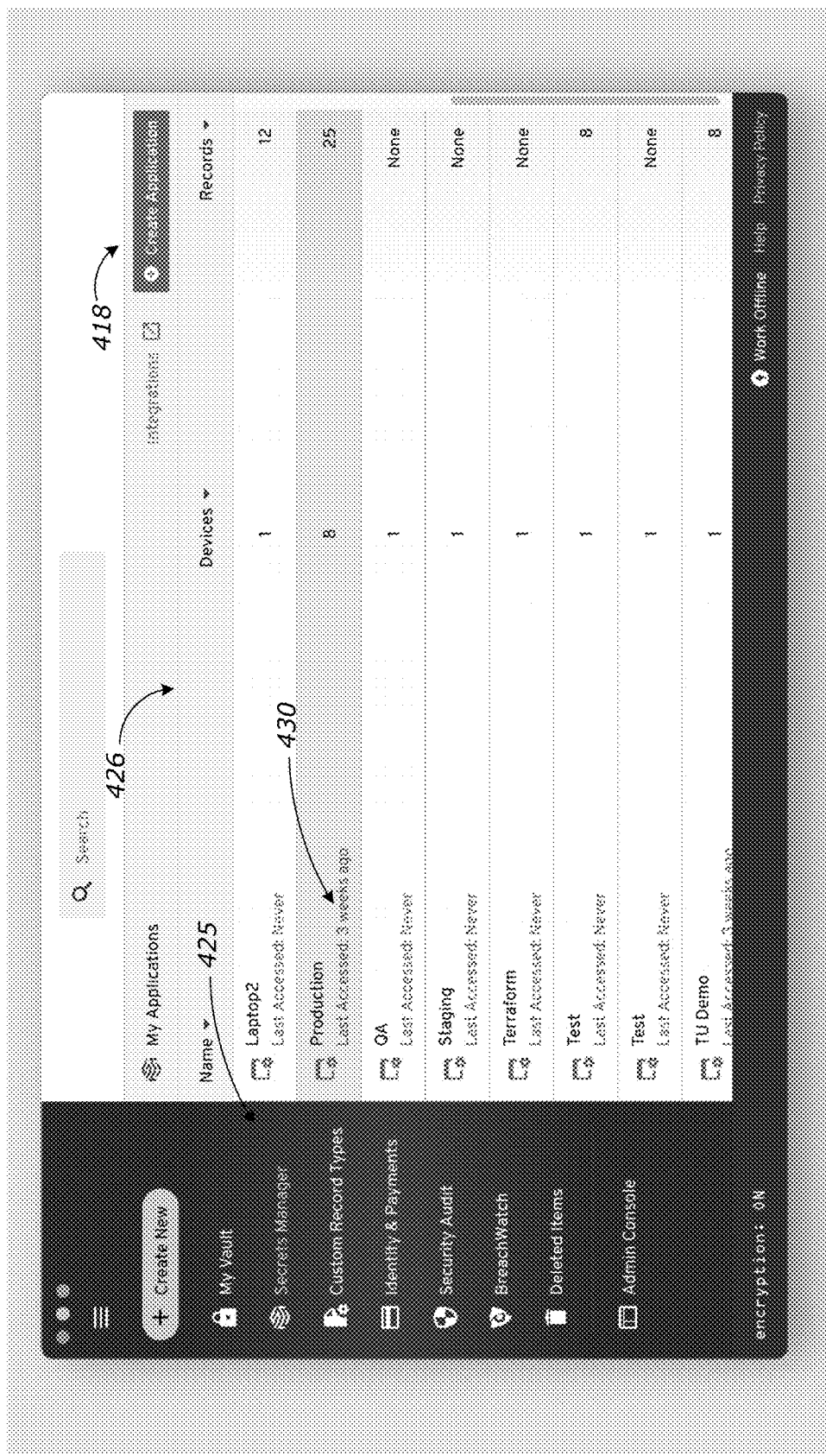

The home screen at 410 may also include a menu at 424 for selecting functions and contents for display, which may depend on the tools available to the secrets manager application program operating on the client device. The home screen 410 in FIG. 4B illustrates a user's vault indicated by the highlighted "My Vault" function in the menu 424. FIG. 4C depicts a list of applications at 426 defined for the secrets manager function 425. The user may create and define a new application by selecting the "create application" button at 428. The user may also review the secrets records added to a specific application by selecting the application at 430, which indicates that the Production application has been selected. The production application in FIG. 4C is shown as having eight devices configured for it and as having 25 records associated with the Production application.

Figure 4D:
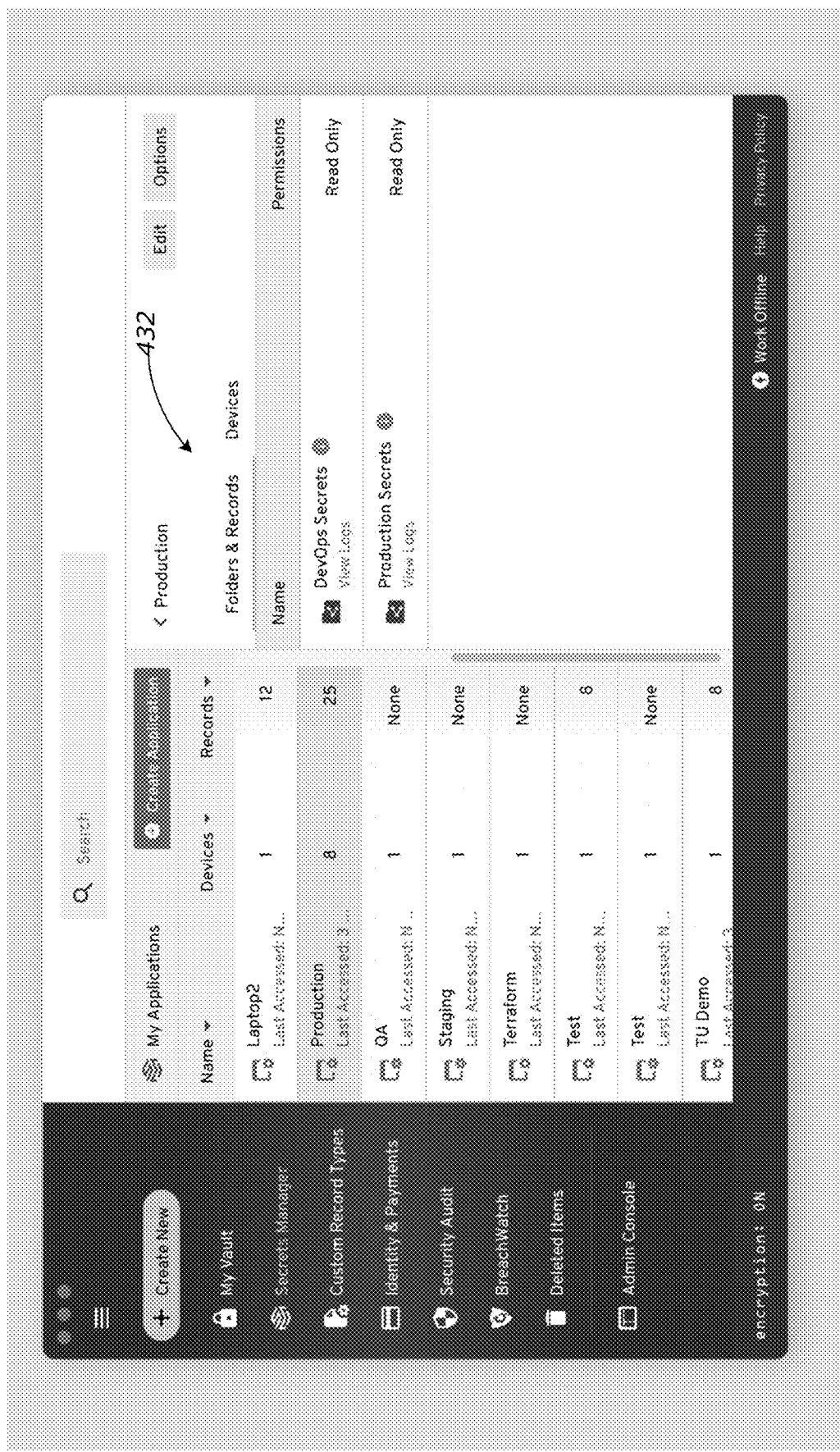

FIG. 4D illustrates a more detailed view of the Production application at 432, which lists two shared folders, "DevOps Secrets" and "Production Secrets." Between the two folders, 25 secret records are associated with the Production application.

Figure 4E:
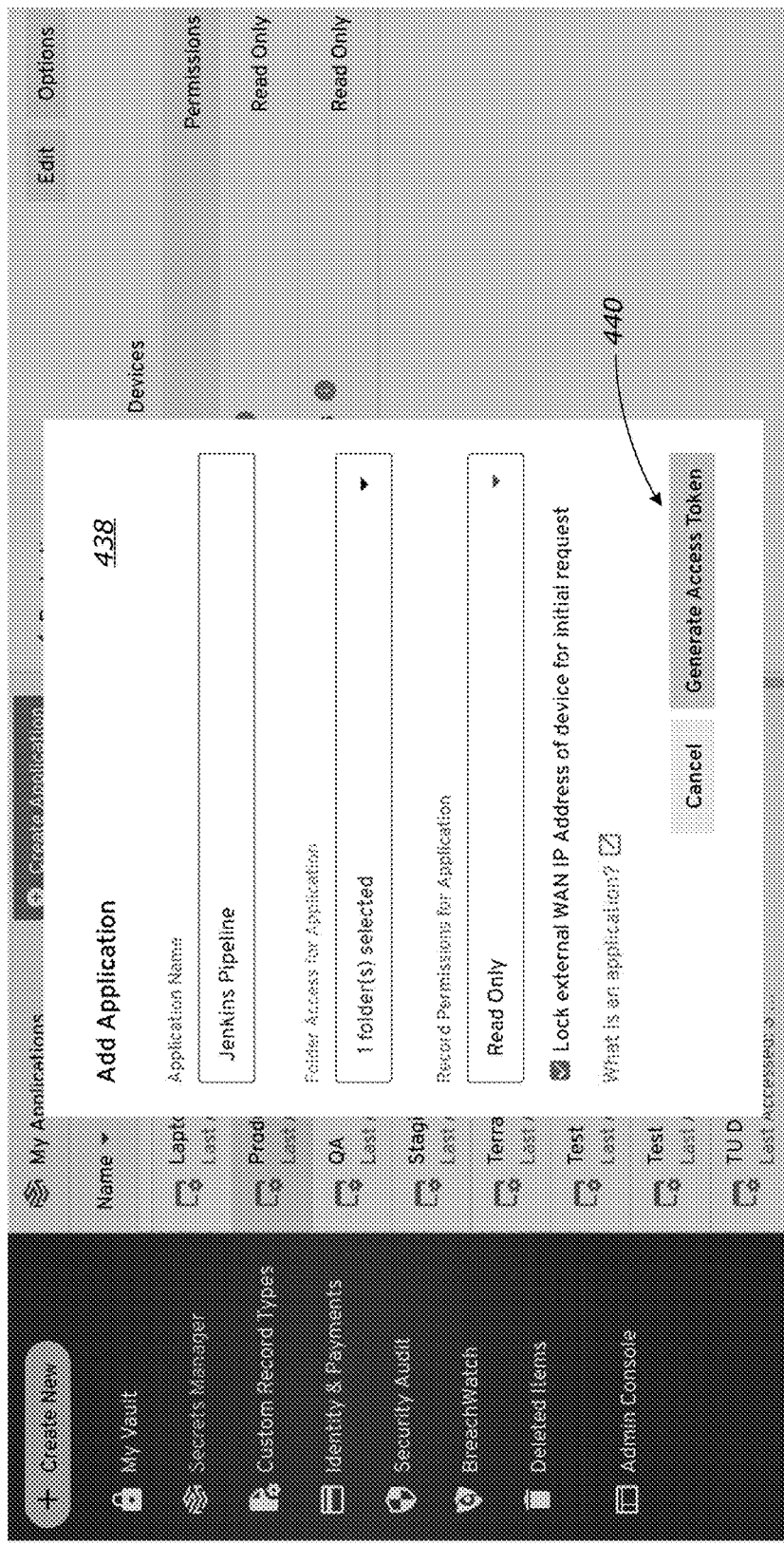
Figure 4F:
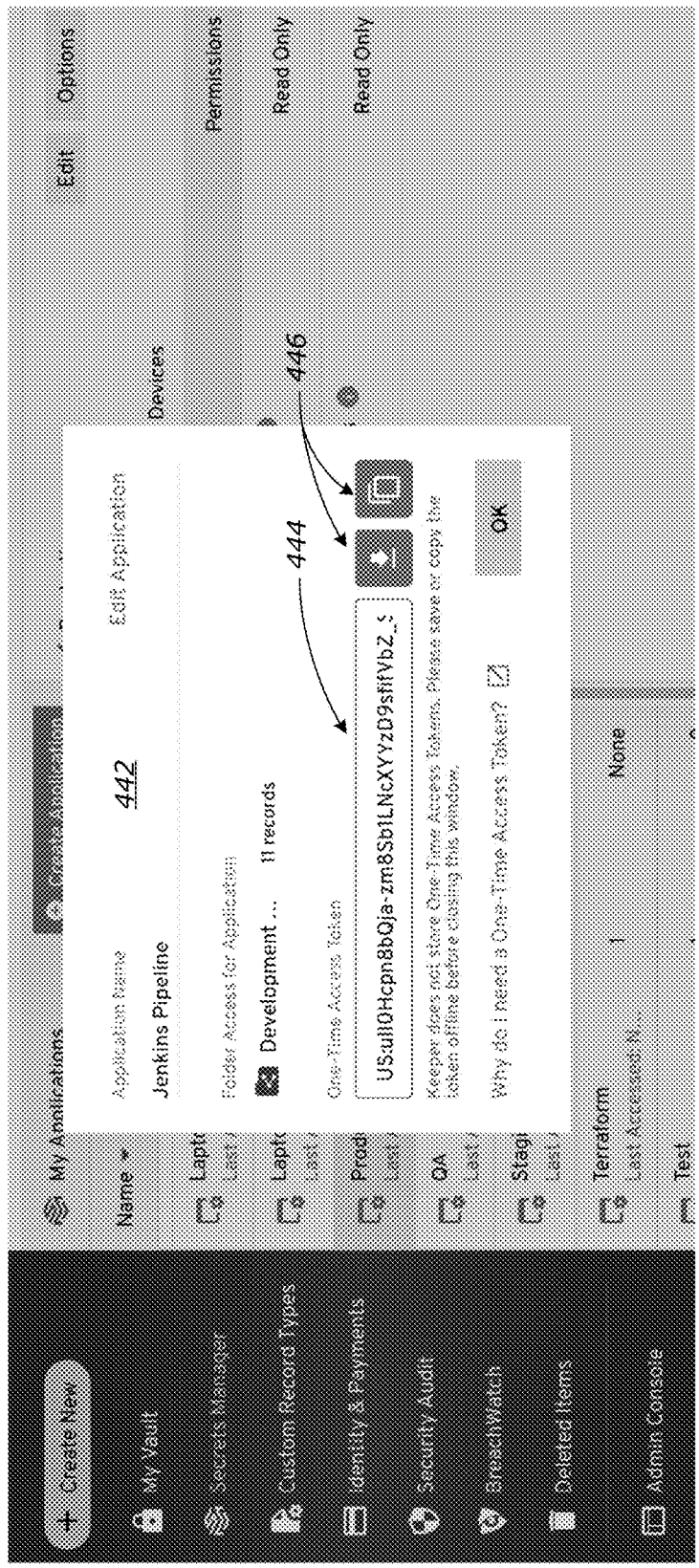

At FIG. 4E, the user has selected a create application function resulting in a display of an application definition box 438. The application definition box 438 includes information prompts for the user to enter information such as an application name, a folder for accessing the application in the GUI, and permissions for the application. The user may select "generate access token" to create the application at 440. The create application function then generates an application key for the new application and an access token corresponding to a client device with which secrets associated with the application will be shared. When the user selects "generate access token" at 440, the prompt 442 in FIG. 4F is displayed. The prompt 442 in FIG. 4F includes a generated one-time access token 444 and tools at 446 for either copying or downloading the access token for communication to a sharing client device. The GUI in FIGS. 4B-4F may be used to add additional client devices to a selected application. The user may select the "Devices" menu for a selected application in the applications list in FIG. 4D, for example. A prompt may then be displayed for generation of an access token similar to the prompt 438. The generated access tokens are communicated to the sharing client devices for subsequent authentication with the secrets vault server.

Figure 5:
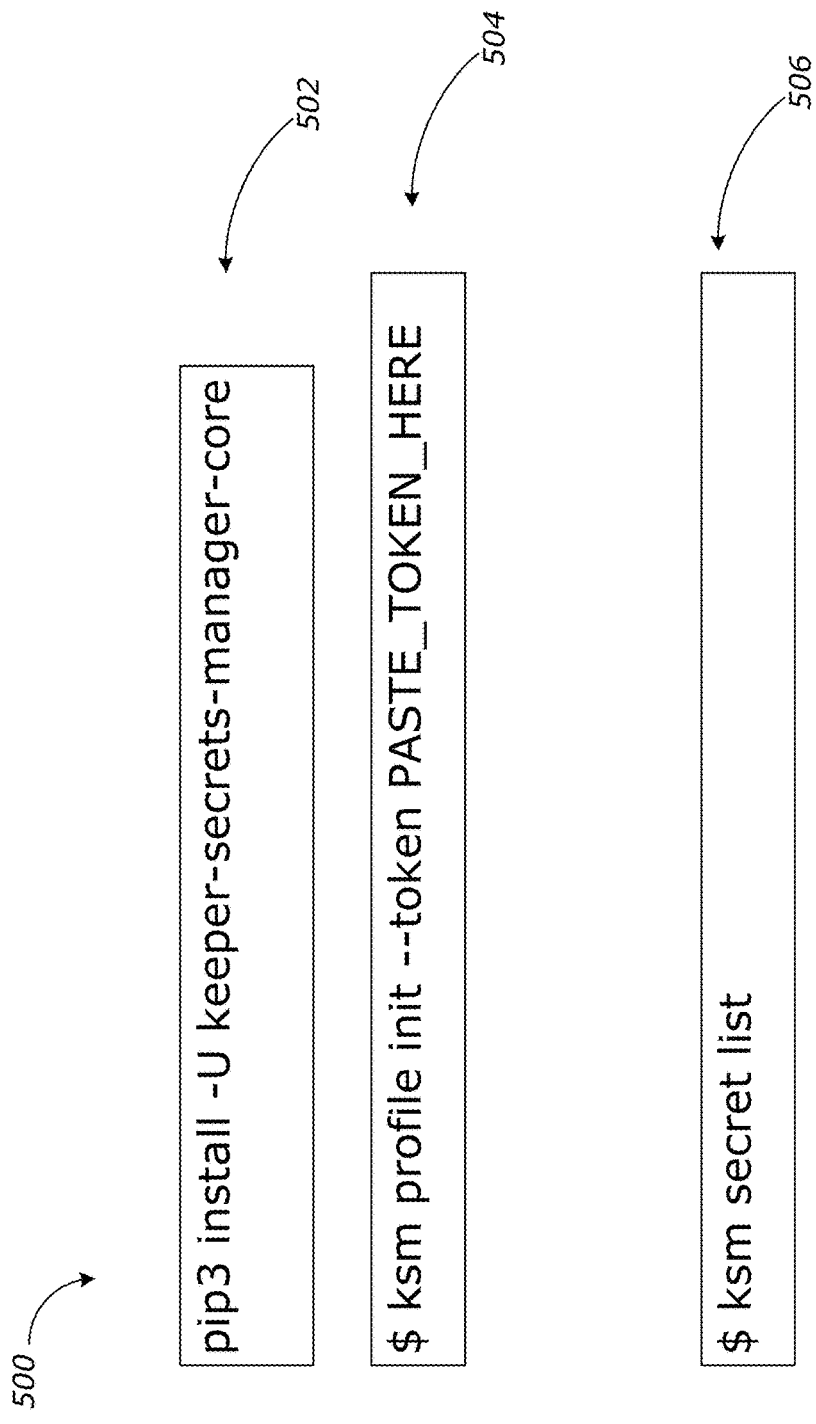
FIG. 5 illustrates operation of an example method for initializing a sharing clients device and retrieving secrets at the sharing client device.

FIG. 5 illustrates operation of an example method 500 for initializing a sharing client device 104 and retrieving secrets at the sharing client device 104. The method 500 includes a step 502, which invokes the 'pip3' install command in the Python SDK to install the secrets manager toolkit. Commands 504 and 506 may be performed at a command line prompt at a terminal, as an instruction in a script, or encoded in a software component operating on the sharing client device 104. FIG. 5 shows an example of the commands 504 and 506 executed from the command line at a terminal. The secrets manager CLI may be invoked in the command line using the "sm" or "ksm" or another suitable command preface. The secrets manager CLI includes a profile command and a secret list command. The profile command and secrets list commands are described in Table 1 below, which lists an example set of CLI commands that a user may execute from the secrets manager CLI.

The basic syntax for secret manager CLI commands is:
$ sm <command> <sub-command> <options>

TABLE 1

| Command | Explanation |
| --- | --- |
| secret | Retrieve secrets from the vault |
| profile | Manage local configuration profiles |
| init | Initialize one time access token |
| exec | Execute scripts with environmental variable substitution |
| config | Manager CLI configuration |
| version | Display the CLI version information |
| shell | Start the CLI in an interactive shell mode |
| quit | Quit the shell mode |

The "profile init" function at command line 504 initializes the sharing client device 104 at which the user is executing the commands to enable the sharing client device 104 to access secrets associated with the application corresponding to the access token entered as the "token" parameter in the command. The access token is received from the secrets vault client device 102 during the configuration of the sharing client device 104 at the secrets vault client device 102. Execution of command 504 triggers the steps described above with reference to FIGS. 2C and 2D. Command line 506 causes the list of secrets to be displayed on a display associated with the sharing client device 104.

FIG. 6 illustrates a more detailed operation of an example method 600 for initializing sharing client devices and accessing secrets in a Python system development environment. The method 600 in FIG. 6 depicts code that may be executed in software as opposed to entered by the user in a command line. Line 602 in FIG. 6 is similar to command line 502 in FIG. 5, except that line 602 triggers the installation of the secrets manager resources as libraries or APIs for integration with the Python code executing in the sharing client device 104. Lines 604 and 606 perform additional initialization functions, which may include, for example, the data described below in Table 2.

TABLE 2

| Parameter | Required | Description | Type |
| --- | --- | --- | --- |
| hostname | Yes | The destination host where your Enterprise tenant is located: keepersecurity.com keepersecurity.eu keepersecurity.com.au govcloud.keepersecurity.us | String |
| token | Yes | One Time Access Token | String |
| config | Yes | File Storage Configuration | KeyValueStorage |

Lines 608, 610, 612, 614 are lines of code that, when executed, will print or display the secrets associated with the Application corresponding to the access token provided to the sharing client device. The lines of code are in the Python programming language and incorporate data configured according to the data structures in Table 2 and the execution of the initialization instructions at 604 and 606.

FIG. 7 illustrates operation of an example method 700 for initializing sharing client devices and accessing secrets in a Java system development environment. The lines of code shown in FIG. 7 operate in a manner similar to that of the code in FIG. 6.

The examples in FIGS. 6 and 7 illustrate examples of implementations of secrets manager SDKs for operation in Python and Java SDKs, respectively. Secrets manager SDKs may be provided for SDKs for developing code in other languages.

FIG. 8 illustrates operation of an example method 800 for initializing sharing client devices and accessing secrets in a Docker CI/CD system development environment. The implementation in FIG. 8 involves a secrets manager plugin developed for operation with the Docker Image CI/CD environment. The secrets manager plugin defines environmental variables for accessing the secrets corresponding to the application associated with the sharing client device executing the Docker Image build. FIG. 9 illustrates operation of an example method 900 for initializing sharing client devices and accessing secrets in a GiHub CI/CD system development environment. The example implementation in FIG. 9 may also involve a secrets manager plugin that includes software components for accessing secrets once the secrets are associated with an application, and once the application is shared with a sharing client device.

In the description of the creation of secrets and shared folders, the sharing of the secrets to other client devices involved initially providing access tokens to sharing client devices configured to obtain access to the secrets. The access token may be communicated to the sharing client device using communications tools that do not involve storing the access token in the secrets vault server. In an example implementation, the secrets vault program 114 (in FIG. 1) may be provided with a feature that somewhat automates the process for the user by copying an URL to a clipboard on the secrets vault client device. The user may then paste the URL in a message or otherwise provide the URL to a team member. By accessing the URL, a webpage containing the secret being shared may be provided to the receiver of the URL.

Figure 10A:
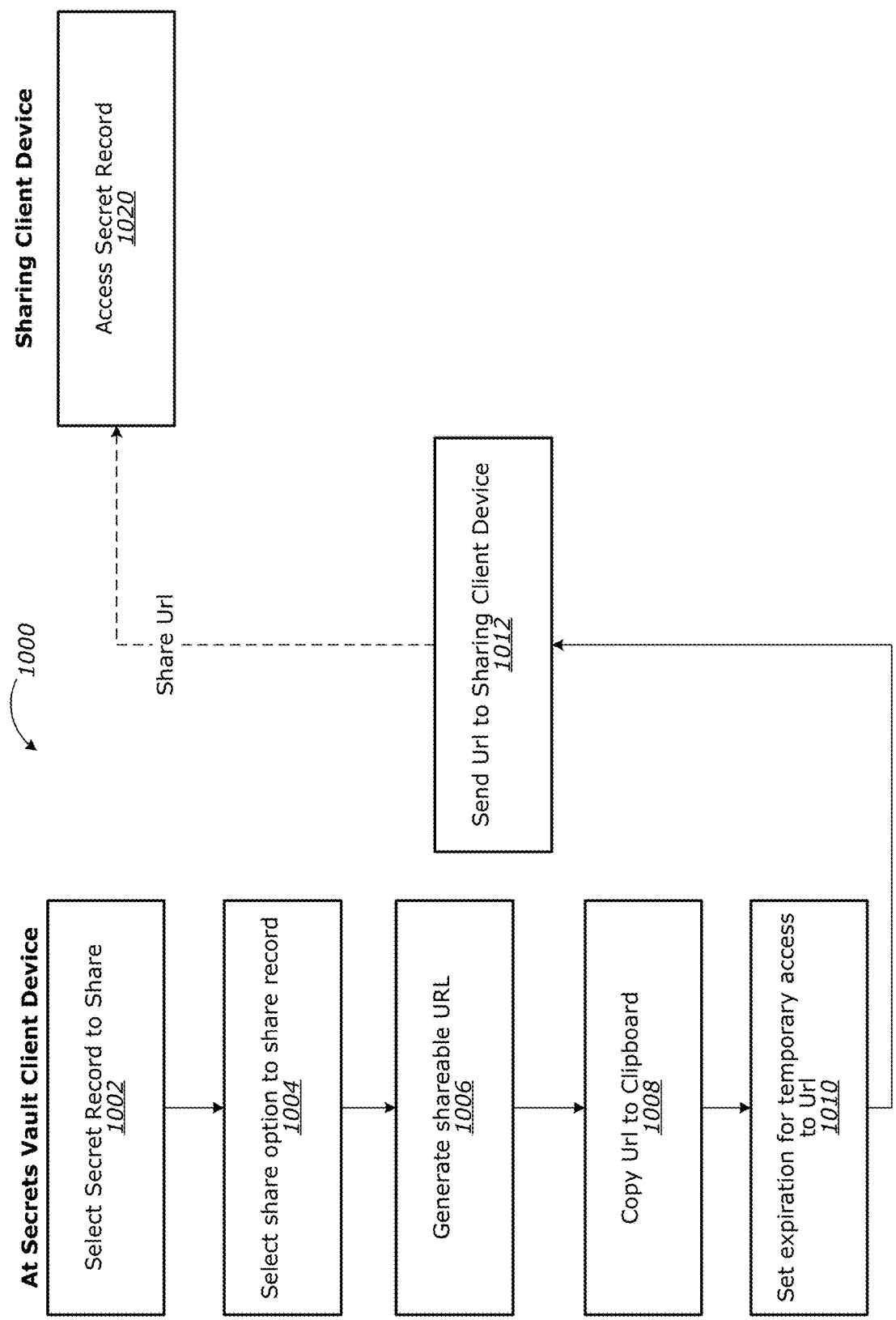
FIG. 10A is a flowchart illustrating operation of a method for sharing access to secrets by sharing an URL to a sharing client device.
Figure 10B:
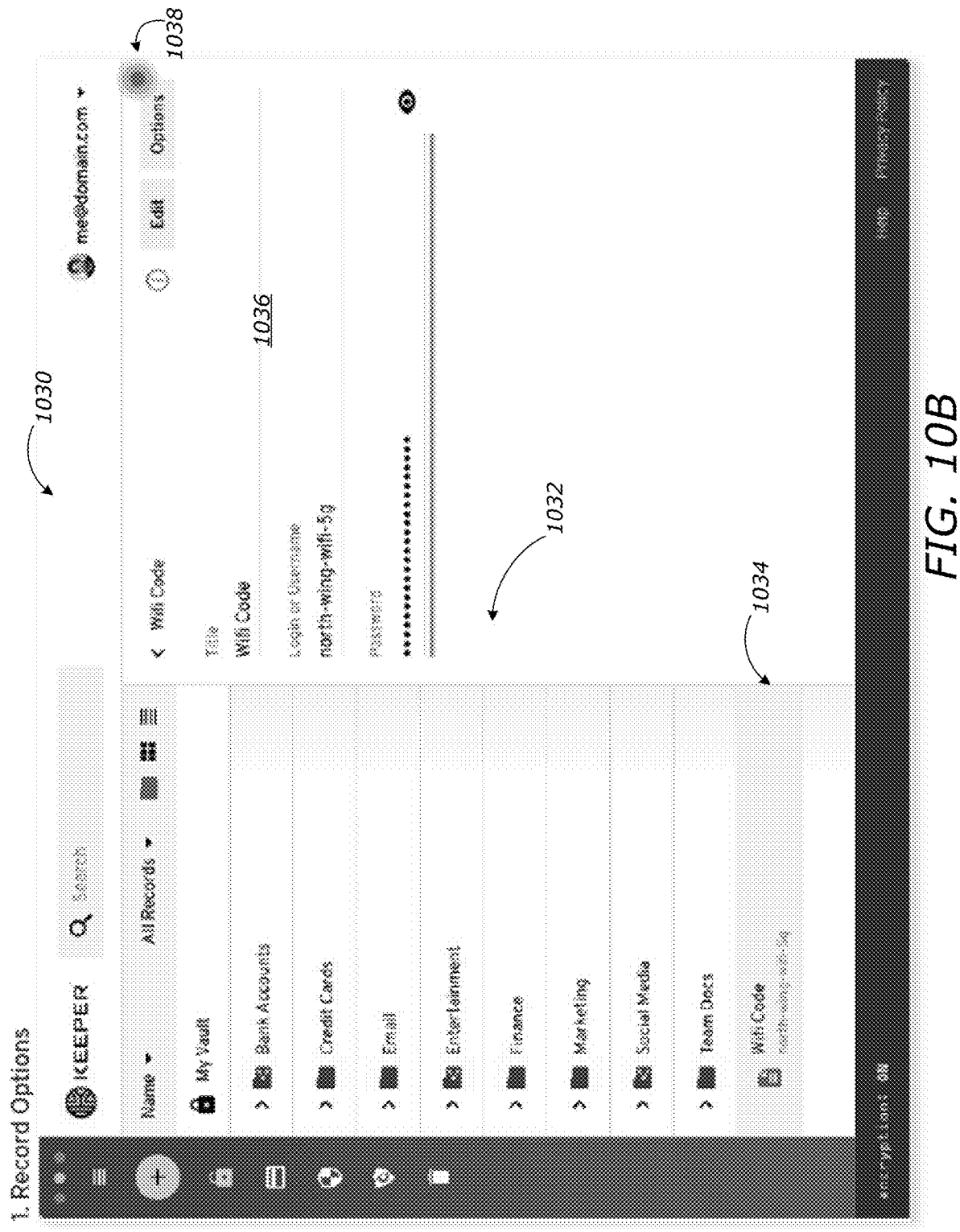
FIG. 10B is an example user interface configured to manage secrets in a secrets vault client device.

FIG. 10A is a flowchart illustrating operation of a method 1000 for sharing access to secrets by sharing an URL to a sharing client device. The method 1000 in FIG. 10A may be performed as a feature of a secrets vault program 106 *pm* the secrets vault client device 102. The user may wish to share one or more secrets or a shared folder. At step 1002, the user selects the secret or record to share. At step 1004, the user selects a share option to share the record. At step 1008, the user selects a function that generates the shareable URL with an encrypted version of the secret embedded in the URL. At step 1010, the user selects a function that copies the URL to a clipboard. At step 1012, the user may select a time at which access to the URL will expire. At 1014, the user sends the URL to the sharing client device. At step 102, the user at the sharing client device access the shareable URL.

Figure 10C:
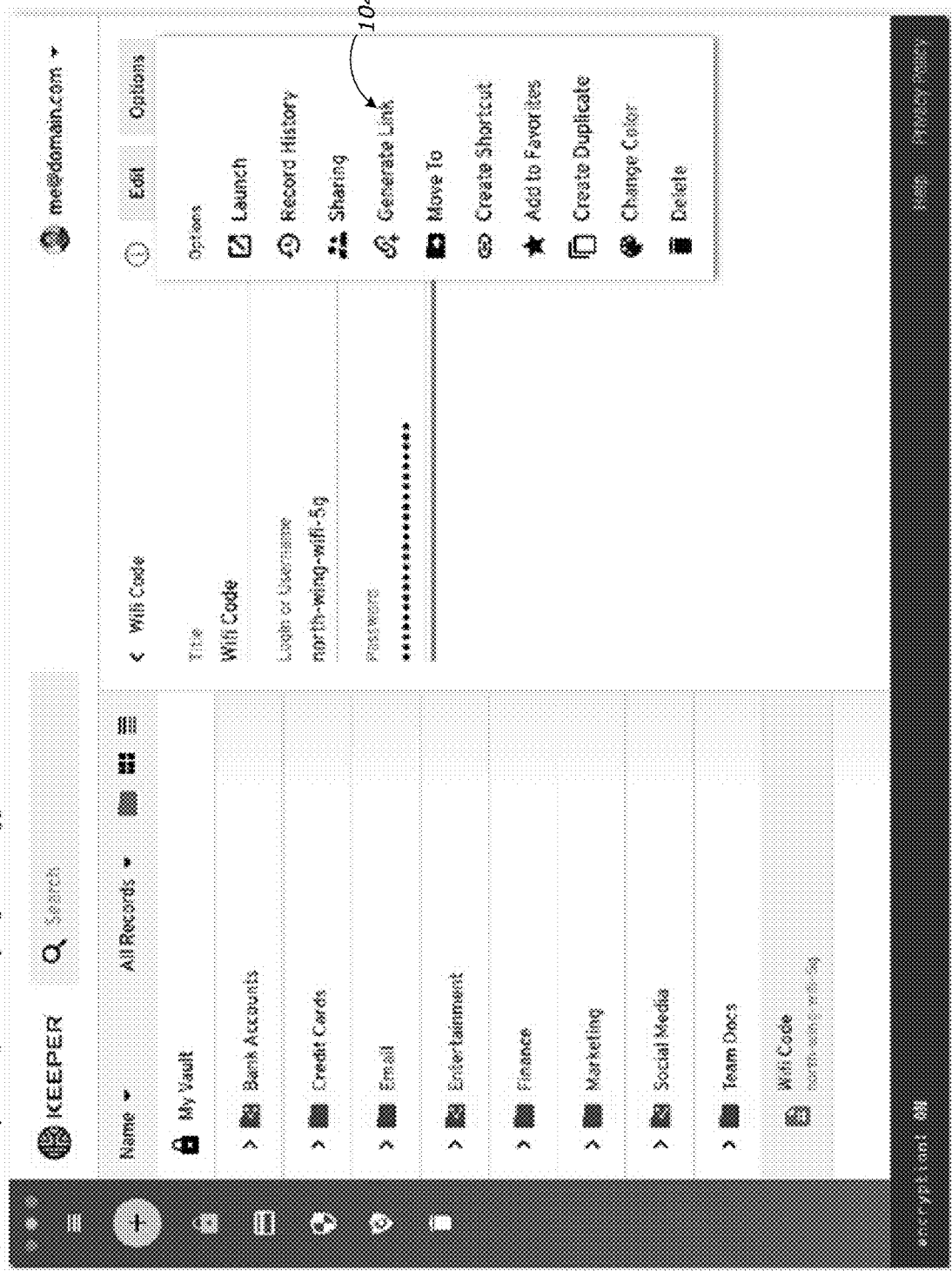
FIG. 10C is an example user interface configured to manage secrets in a secrets vault client device and further illustrating a drop menu to access a sharing function to share secrets.
Figure 10D:
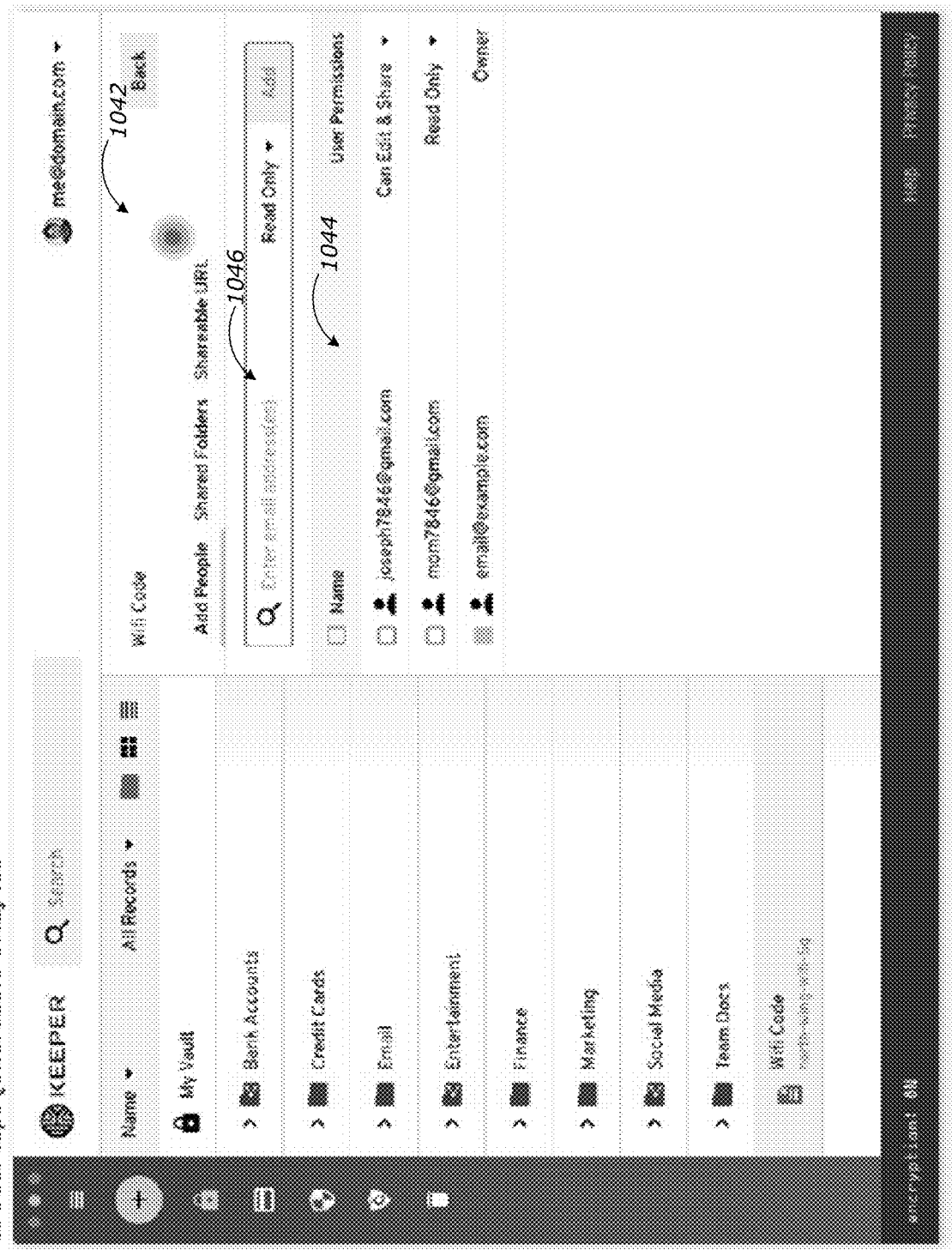
FIG. 10D is another example user interface configured to manage secrets in a secrets vault client device.
Figure 10E:
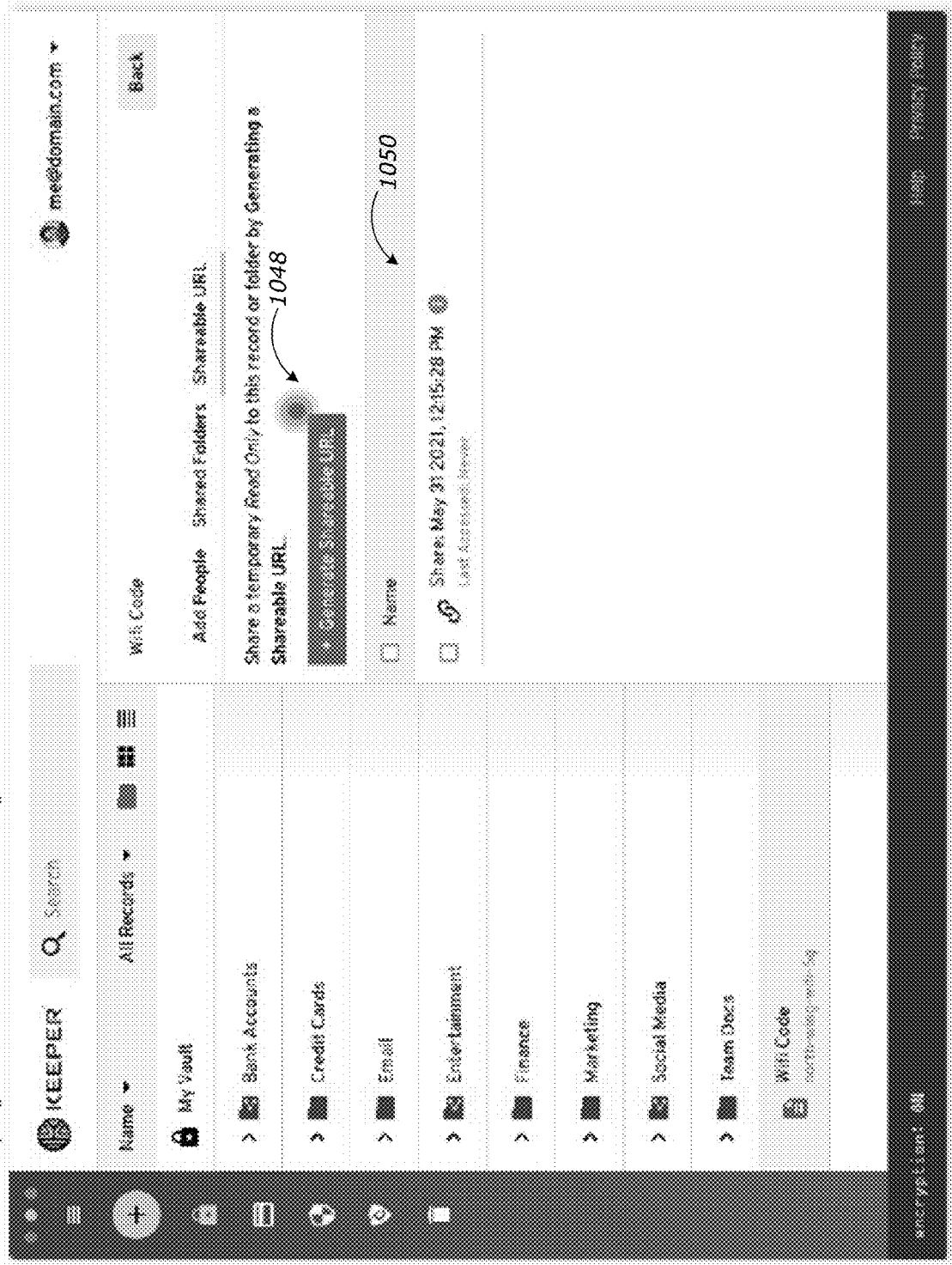
FIG. 10E is an example user interface configured to manage secrets in a secrets vault client device and further illustrating a function to generate the shareable URL.
Figure 10F:
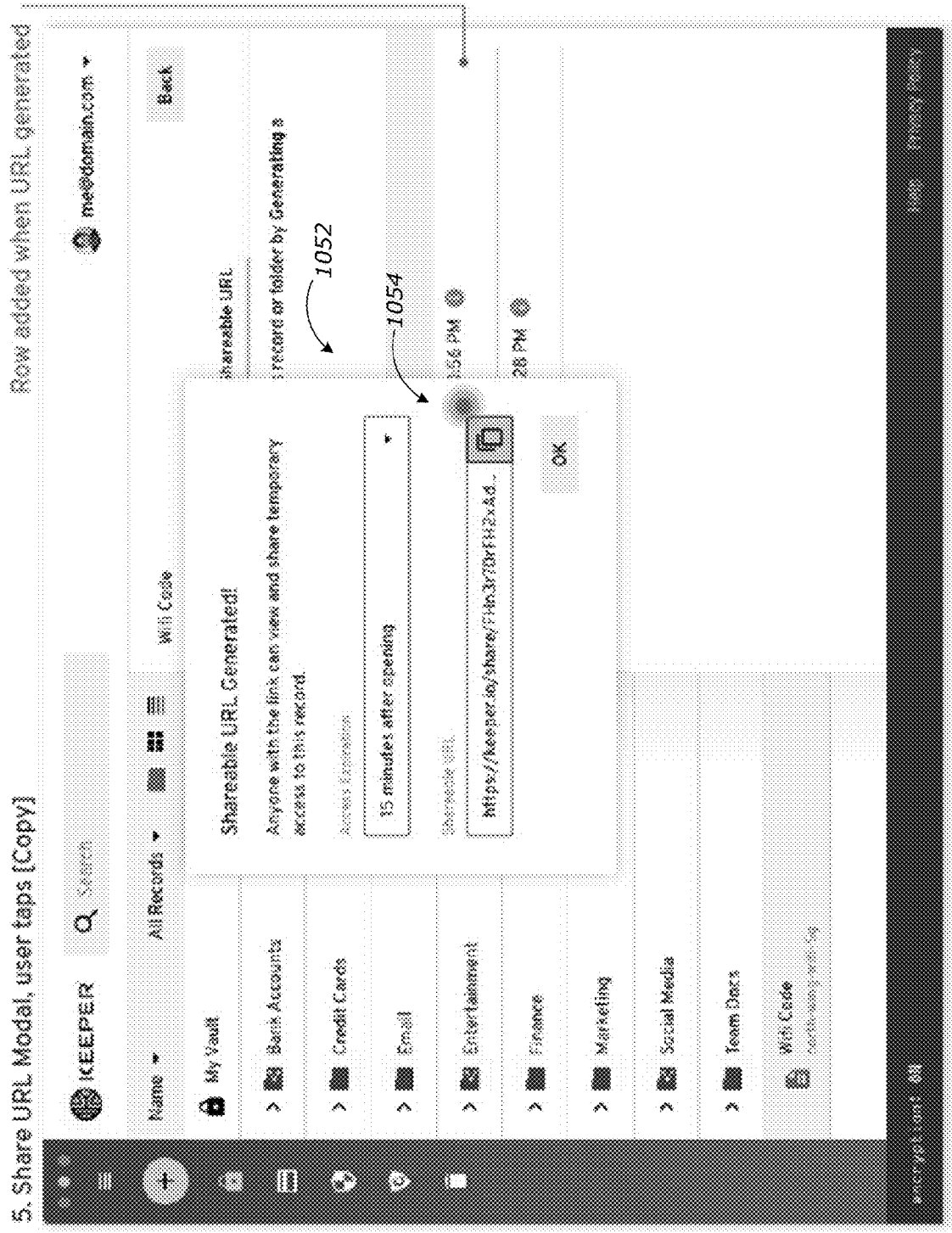
FIG. 10F is an example user interface configured to manage secrets in a secrets vault client device and further illustrating a function for setting an access expiration.
Figure 10G:
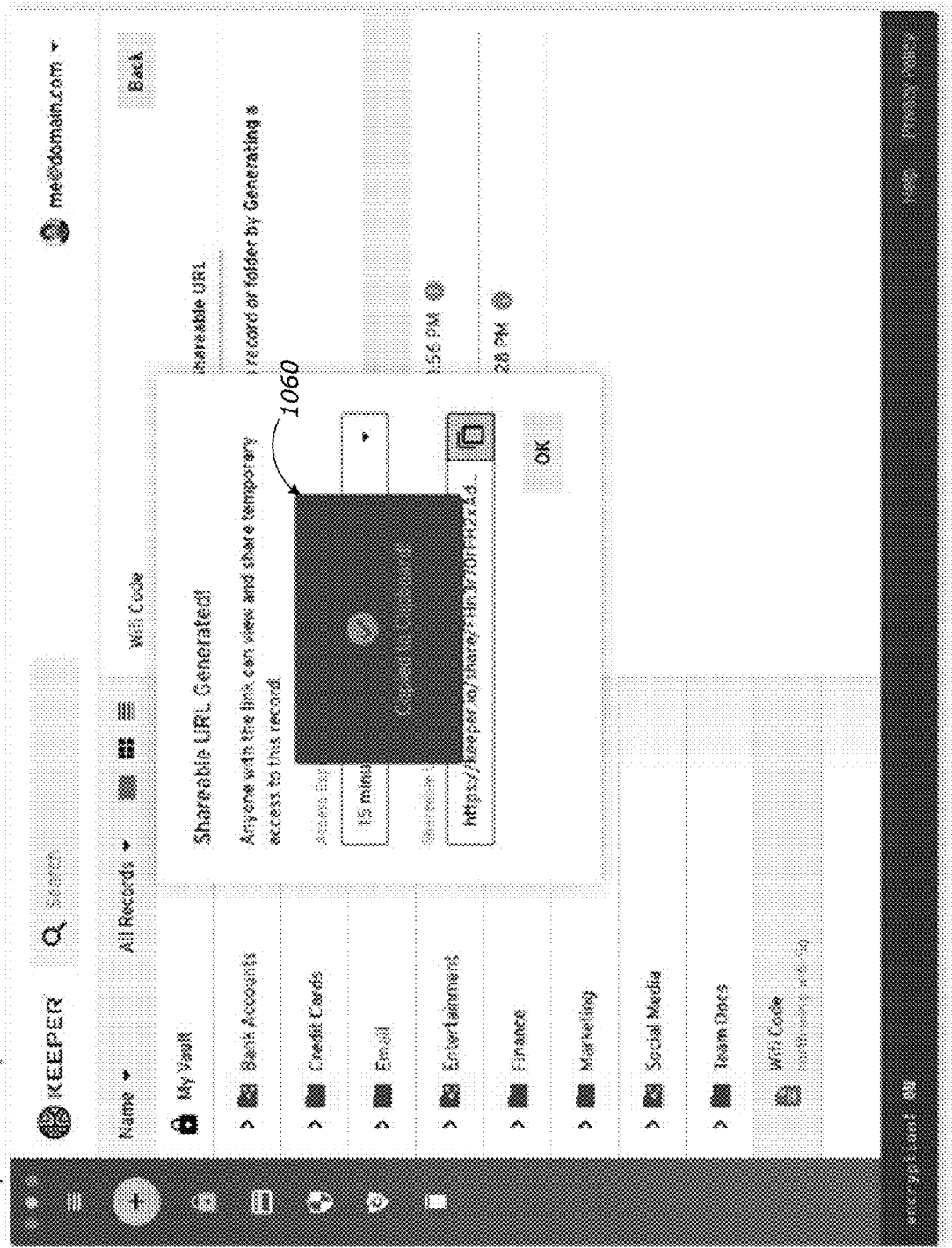
FIG. 10G is an example user interface configured to manage secrets in a secrets vault client device and further illustrating a copying of the URL to a clipboard for implementing the sharing of the URL for accessing secrets by a sharing client device that will receive the URL.
Figure 10H:
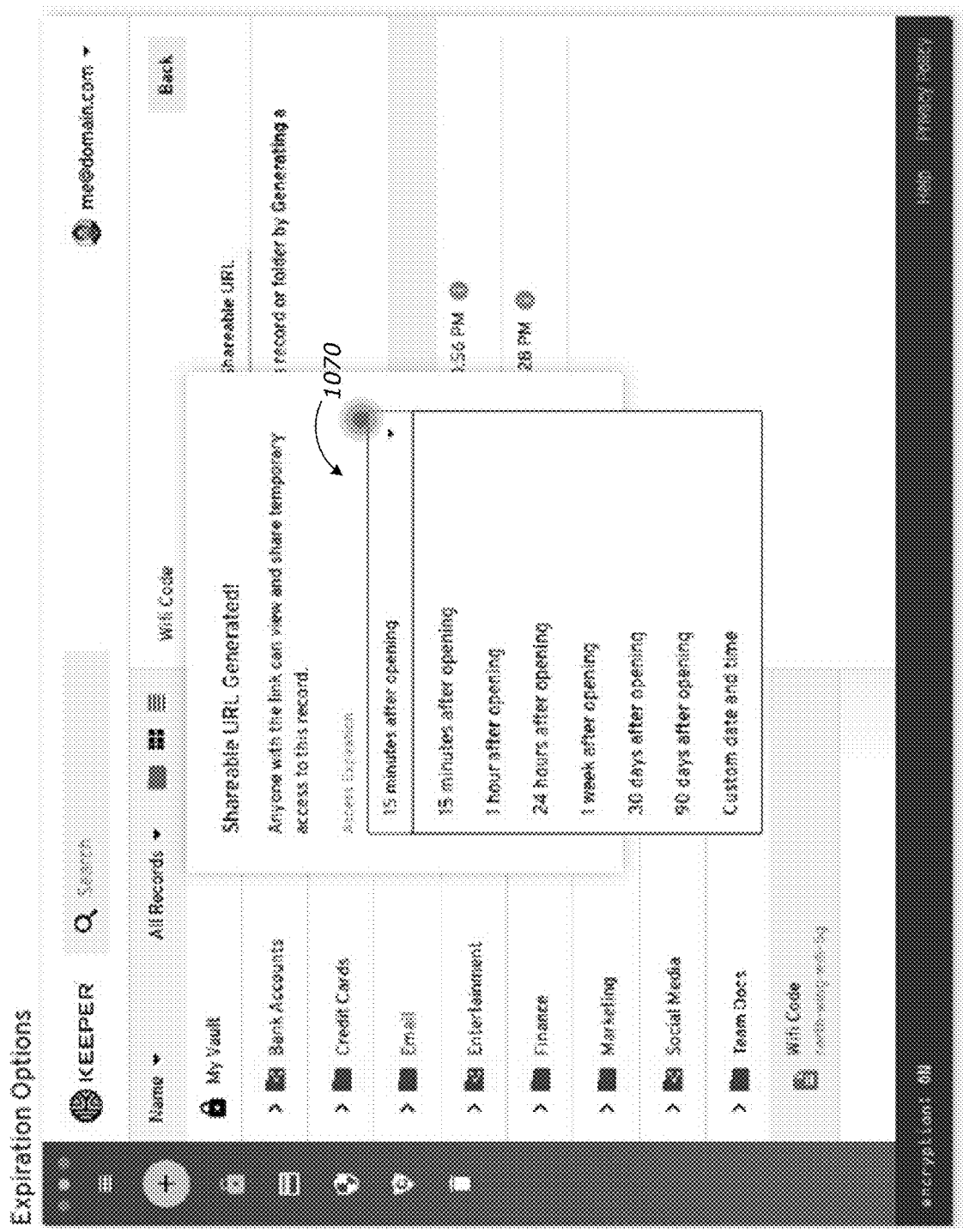
FIG. 10H is an example showing expiration time options.
Figure 10I:
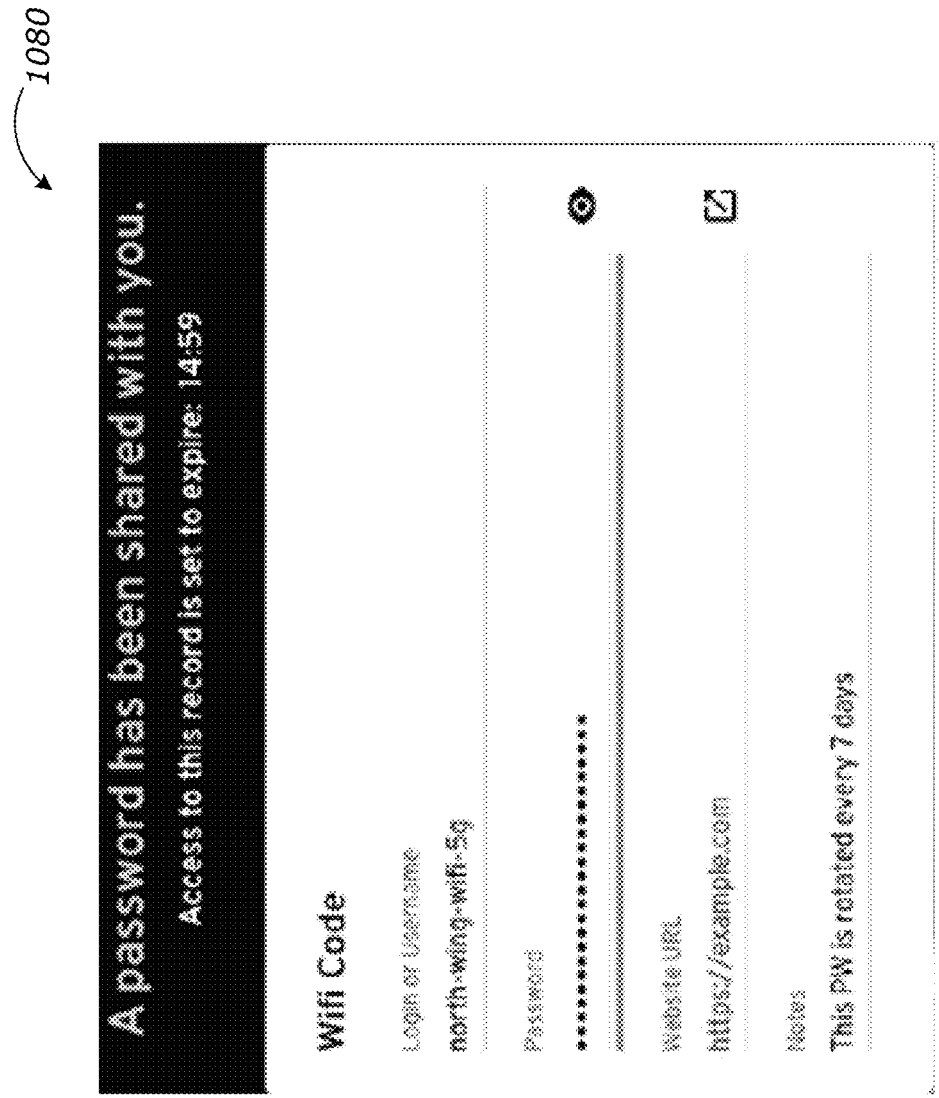
FIG. 10I is an example showing a display of notifications.

FIGS. 10B-10I depict user interfaces having functions for performing the steps in the flowchart 1000 in FIG. 10A. At FIG. 10B, the user determines a record or secret to share using a user interface 1030. The user may select from a list of shared folders and secrets 1032. The user may select the WiFi Code record 1034, which displays the details of the secret at 1036. The user may select an option from an options menu 1038 to share the secret. In FIG. 10C, a list of options drop down in a menu of actions that may be performed in relation to the secret. The user may for example select the sharing option or the generate link option at 1040. At FIG. 10D, options for sharing appear in the user interface. The user may select the "sharable URL" option at 1042. In FIG. 10E, a button appears at 1048 that if pressed would begin the process of generating a shareable link. The user interface also depicts at 1050 information about the sharing of the URL. When the user selects the button at 1048, a popup box appears at 1052 in FIG. 10F providing a default access expiration time with a drop down menu offering different times for access expiration. The popup box at 1052 also displays the shareable URL generated for sharing the records selected by the user. When the user selects OK in the popup box in FIG. 10F, an alert box at 1060 is provided in FIG. 10G informing the user that the URL is copied to the clipboard. FIG. 10H shows the expiration time options that may be made available to the user in selecting an expiration time for accessing the secrets. FIG. 10I illustrates a display of a notification at 1080 on the display of the sharing client device notifying the user that the secret previously selected by the user at the secrets vault client device 102 is available to the user at the sharing client device 104.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A computer-implemented method for managing secrets in an enterprise computing network comprising:
   generating, at a first client device, at least one secrets record;
   generating, at the first client device, an application record and associating the application record with a computing environment in which the secrets are to be used, the application record including an application key;
   encrypting, at the first client device, the at least one secrets record using the application key to generate at least one encrypted secrets record;
   sending, to a server, the at least one encrypted secrets record;
   configuring, at the first client device, a second client device by:
      generating an access token corresponding to the second client device; and
      sending the access token to the second client device via a secondary communications channel,
      wherein the access token is used to associate the second client device to an application using an encrypted application key;
   initializing an interface using the access token at the second client device,
   wherein initializing the interface comprises:
      receiving the access token from the first client device before sending a first-time secrets request at the second client device; and
      installing a toolkit to execute on the second client device using the access token,
      wherein the toolkit comprises software components configured to send requests for secrets records in the server and to receive the secrets records for use in the corresponding computing environment;
   performing, at the second client device, a first-time authentication with the server using the association between the access token and the application key;
   receiving, at the second client device in response to the first-time authentication, the at least one encrypted secrets record from the server and the encrypted application key corresponding to the second client device;
   decrypting the encrypted application key using the access token at the second client device to generate the application key; and
   decrypting the at least one encrypted secrets record using the application key to generate the at least one secrets record for use by the second client device.

2. The computer-implemented method of claim 1, wherein generating the at least one secrets record comprises:
    generating a secret;
    encrypting the secret using a record key; and
    using the record key as the at least one secrets record to generate the at least one encrypted secrets record,
    where the step of sending the at least one secrets record to the server includes sending the secret as encrypted ciphertext associated with the at least one secrets record, and the step of receiving, at the second client device in response to the first-time authentication, the at least one encrypted secrets record includes receiving the encrypted ciphertext.

3. The computer-implemented method of claim 1, wherein the at least one secrets record includes a shared folder key associated with a shared folder, where:
    the step of generating the at least one secrets record includes generating a plurality of secrets records to store in the shared folder and encrypting the plurality of secrets records using the shared folder key;
    the step of encrypting the at least one secrets record includes encrypting the shared folder key using the application key; and
    the step of decrypting the at least one encrypted secrets record includes using the application key to generate the shared folder key and using the shared folder key to decrypt the plurality of secrets records in the shared folder.

4. The computer-implemented method of claim 1, wherein configuring the second client device further comprises:
    generating at the first client device a client identifier by hashing the access token using a hash function and sending the client identifier corresponding to the second client device to the server; and
    generating the encrypted application key at the first client device by encrypting the application key using the access token corresponding to the second client device.

5. The computer-implemented method of claim 4, wherein performing the first time authentication comprises:
    generating, on the second client device, a hashed access token by hashing the access token using the same hash function as the hash function used by the first client device to generate the client identifier; and
    sending, on the second client device, the first-time secrets request to the server, the first-time secrets request including the hashed access token to authenticate the second client device based on a comparison of the hashed access token with the client identifier,
    where the server sends a reply with the encrypted application key and the at least one encrypted secrets record to the second client device.

6. The computer-implemented method of claim 5, further comprising:
    sending requests for secrets using the client identifier after the step of receiving the response to the sending of the first-time secrets request.

7. The computer-implemented method of claim 6, further comprising:
    generating at the second client device, a key pair including a client public key and a client private key;
    storing the client private key in secure storage on the second client device; and
    sending the client public key to the server as the client public key associated with the client identifier associated with the second client device.

8. The computer-implemented method of claim 7, further comprising deleting the access token at the second client device after generating the key pair.

9. The computer-implemented method of claim 7, wherein generating the key pair includes generating an elliptical curve ("EC") key pair to generate the client public key as a client EC public key and the client private key as a client EC private key.

10. The computer-implemented method of claim 7, wherein the server deletes the encrypted application key associated with the client identifier of the second client device after sending the encrypted application key to the second client device in response to the first-time secrets request.

11. The computer-implemented method of claim 7, wherein sending requests for secrets using the client identifier includes:
    generating a request communication payload including the client identifier and a request message; and
    signing the request message with the client private key associated with the second client device.

12. The computer-implemented method of claim 11, further comprising:
    receiving, in configuring the second client device, a secrets vault public key configured to enable encryption of communications with the server,
    where the server includes a secrets vault private key associated with the secrets vault public key to decrypt communications signed with the secrets vault public key.

13. The computer-implemented method of claim 12, wherein sending requests for secrets using the client identifier includes:
    encrypting a randomly generated transmission key with the secrets vault public key;
    sending the encrypted transmission key to the server,
    where the server decrypts the encrypted transmission key with the secrets vault private key associated with the secrets vault public key, and
    where the server stores the transmission key for communications with the second client device; and
    encrypting the request communication payload using the transmission key at the second client device.

14. The computer-implemented method of claim 13, wherein sending requests for secrets using the client identifier includes:
    receiving, at the server, the request communication including the request communication payload from the second client device;
    decrypting the request communication payload using the transmission key to retrieve the client identifier and the signed request message;
    retrieving the client public key corresponding to the client identifier;
    checking a signature of the request message using the client public key to retrieve a request for secrets contained in the request communication payload; and
    sending, at the server, the at least one encrypted secrets record associated with the client identifier.

15. The computer-implemented method of claim 14, further comprising:
    receiving the at least one encrypted secrets record at the second client device; and
    decrypting the at least one encrypted secrets record using the application key at the second client device to generate the at least one secrets record at the second client device.

16. The computer-implemented method of claim 7, wherein installing the toolkit includes:
- installing a program in the computing environment of the second client device, the program comprising computer program functions configured to issue commands to the server,
- where the commands control the server to configure and manage data associated with secrets records stored on the server; and
- initializing the program in the computing environment to enable invocation of program functions from within the computing environment.

17. The computer-implemented method of claim 16, wherein the computing environment is a software development system, and
- where the program is installed as a software development kit ("SDK") configured to provide a programming interface for corresponding software development systems to enable execution of instructions to issue commands to the server.

18. The computer-implemented method of claim 16, wherein the computing environment is a continuous integration/continuous development (CI/CD) system, and
- where the program is installed as command line interface (CLI) and an applications programming interface (API).

19. The computer-implemented method of claim 18, wherein initializing the program includes defining a plurality of environmental variables to execute functions during system builds in the CI/CD system, and
- where the functions are configured to send requests for secrets to the server.

20. The computer-implemented method of claim 16, wherein installing the program includes:
- installing a command line interpreter (CLI) and an applications programming interface (API).

21. The computer-implemented method of claim 1, wherein sending the access token to the second client device via the secondary communication channel includes sending the access token in an email or a text message.

22. The computer-implemented method of claim 1, wherein sending the access token to the second client device via the secondary communication channel includes copying the access token into a clipboard and pasting the access token in a prompt for the access token.

23. The computer-implemented method of claim 1, wherein sending the access token to the second client device via the secondary communication channel includes:
- generating a shareable uniform resource locator (URL);
- embedding the access token into a fragment identifier portion of the shareable URL;
- selecting at least one user to authorize to receive the shareable URL; and
- and sending the shareable URL to the selected users.

24. The computer-implemented method of claim 1, further comprising:
- configuring, at the first client device, another client device by:
  - generating another access token corresponding to the another client device; and
  - sending the another access token to the another client device via another secondary communications channel,
  - wherein the another access token is used to associate the another client device to the application.

25. A system comprising:
a first client device,
wherein the first client device stores instructions, that when executed by the first client device, cause the first client device to:
- generate at least one secrets record;
- generate an application record and associate the application record with a computing environment in which the secrets are to be used, the application record including an application key;
- encrypt the at least one secrets record using the application key to generate at least one encrypted secrets record;
- send, to a server, the at least one encrypted secrets record; and
- configure a second client device by:
  - generating an access token corresponding to the second client device; and
  - sending the access token to the second client device via a secondary communications channel,
  - wherein the access token is used to associate the second client device to an application using an encrypted application key; and a second client device,
wherein the second client device stores instructions, that when executed by the second client device, cause the second client device to:
- initialize an interface using the access token,
- wherein initializing the interface comprises:
  - receiving the access token from the first client device before sending a first-time secrets request at the second client device; and
  - installing a toolkit to execute on the second client device using the access token,
  - wherein the toolkit comprises software components configured to send requests for secrets records in the server and to receive the secrets records for use in the corresponding computing environment;
- perform a first-time authentication with the server using the association between the access token and the application key;
- receive, in response to the first-time authentication, the at least one encrypted secrets record from the server and the encrypted application key corresponding to the second client device;
- decrypt the encrypted application key using the access token to generate the application key; and
- decrypt the at least one encrypted secrets record using the application key to generate the at least one secrets record for use by the second client device.

* * * * *